(12) United States Patent  
Kado et al.

(10) Patent No.: US 8,661,883 B2
(45) Date of Patent: Mar. 4, 2014

(54) SECONDARY AIR SYSTEM DIAGNOSTIC TEST

(75) Inventors: Mark S. Kado, Grosse Pointe, MI (US); Zulfeqar Ali Kosgi, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 464 days.

(21) Appl. No.: 13/105,334

(22) Filed: May 11, 2011

(65) Prior Publication Data

US 2012/0285263 A1    Nov. 15, 2012

(51) Int. Cl.
*G01M 15/00* (2006.01)
*G01G 1/00* (2006.01)
*F01N 3/00* (2006.01)

(52) U.S. Cl.
USPC ......... 73/114.77; 73/861; 73/114.71; 60/274; 60/277; 60/289; 123/533

(58) Field of Classification Search
None
See application file for complete search history.

(56) References Cited

U.S. PATENT DOCUMENTS

| | | |
|---|---|---|
| 5,782,086 A | 7/1998 | Kato et al. |
| 5,921,077 A | 7/1999 | Bayerle et al. |
| 6,023,401 A | 2/2000 | Hashimoto et al. |
| 2005/0138919 A1 | 6/2005 | Nakano et al. |
| 2006/0048504 A1 | 3/2006 | Oi et al. |

*Primary Examiner* — Harshad R Patel
(74) *Attorney, Agent, or Firm* — Ralph E Smith

(57) ABSTRACT

A diagnostic test for a secondary air system comprising an air pump, a first mass air flow sensor connected to the air pump and a first check valve connected to the first mass air flow sensor. A first testing phase is disclosed comprising a first delay period and a first testing period, wherein the air pump is activated. A second testing phase is disclosed comprising a second delay period and a second testing period wherein the first check valve is opened. A third testing phase comprising a third delay period and a third testing period is disclosed wherein the first check valve is closed. A fourth testing phase is disclosed comprising a fourth delay period and a fourth testing period wherein the air pump is deactivated. An optional fifth testing phase is also disclosed comprising a fifth delay period and a fifth testing period wherein the air pump remains off but the check valve is reopened and engine RPMs are increased. The diagnostic test further includes determining one or more failure modes of the system based on the output from the four or five testing phases.

20 Claims, 34 Drawing Sheets

FIG. 7

SECONDARY AIR DIAGNOSTIC HIERARCHY & FAULT MATURATION SUMMARY

SET THE RESPECTIVE HIGH FLOW SYSTEM LEVEL DTC IF
PHASE 2 AND [PHASE 1 OR PHASE 3 OR PHASE 4] (BITS GO HIGH)

SET P2448 AP_FLHI_B1 (BANK 1 SYSTEM FLOW HI)    SET P2449 AP_FLHI_B2 (BANK 2 SYSTEM FLOW HI)

SET THE RESPECTIVE LOW FLOW SYSTEM LEVEL DTC IF
PHASE 2 (BIT GOES HIGH)

SET P0491 AP_FLLO_B1 (BANK 1 SYSTEM FLOW LOW)    SET P0492 AP_FLLO_B2 (BANK 2 SYSTEM FLOW LOW)

SET THE RESPECTIVE MAF SENSOR RAT DTC IF AND ONLY IF
BANK n DELTA = BANK n (AVG PHASE 2 AIRFLOW - AVG PHASE 1 AIRFLOW) > CALIBRATED THRESHOLD
(REGARDLESS OF ANY PHASE FAILURES)

SET P2431 APSMAF1RAT (SMAF1 SENSOR CIRCUIT PERFORMANCE)
SET P2436 APSMAF2RAT (SMAF2 SENSOR CIRCUIT PERFORMANCE)

SET AIR SHUTOFF VALVE RAT DTC IF
NOT PHASE 2 AND PHASE 1 AND PHASE 3 AND PHASE 4 HAVE FAILURES
(ANY BITS IN THOSE PHASES GOES HIGH)
OR
PHASE 3 AND PHASE 4 AND NOT PHASE 1

SET P2440 ASV1STOPEN (AIR SHUTOFF VALVE 1 STUCK OPEN)
SET P2442 ASV2STOPEN (AIR SHUTOFF VALVE 2 STUCK OPEN)

>>> OR & AND ARE LOGICAL OPERATORS <<<

FIG. 35

SECONDARY AIR SYSTEM DIAGNOSTIC TEST

FIELD

The present disclosure relates to diagnostic testing of secondary air systems.

BACKGROUND

Secondary air systems are common in many vehicles and are used to add oxygen to exhaust gases, aiding in final burn off of undesirable emissions. Generally, secondary air systems operate by pumping fresh air into the exhaust with one-way check valves to direct airflow from an electromechanical air pump. The secondary air is injected into the exhaust manifold to help burn the rich air-to-fuel mixture needed at start up. The secondary air system is generally used during normal operation in vehicles with larger engines due to higher air-to-fuel loads.

Since secondary air systems generally comprise a number of junctions and hoses, as well as employ vacuum, hydraulics, and electronics to operate check valves, the identity and location of a failed component can be difficult to determine. Moreover, it is difficult to find out which, if any, components are incorrectly installed during assembly.

SUMMARY

In one form, the present disclosure provides a diagnostic test for a secondary air system comprising an air pump, a first mass air flow sensor connected to the air pump and a first check valve connected to the first mass air flow sensor. The test generally comprises a first testing phase comprising a first delay period and a first testing period wherein the air pump is activated, a second testing phase comprising a second delay period and a second testing period wherein the first and second check valves are opened, a third testing phase comprising a third delay period and a third testing period wherein the first and second check valves are closed, and a fourth testing phase comprising a fourth delay period and a fourth testing period wherein the air pump is deactivated. The test includes determining one or more failure modes of the system based on the output from the four testing phases.

In another aspect of the test capabilities, for example for an embodiment having a second check valve in fluid communication with the air pump and a second mass flow sensor in fluid communication with the second check valve and the second check valve is opened in the second testing period and the second check valve is closed in the third testing period, the test can further include recording measured air flow from each of the first and second mass air flow sensors during each of the first, second, third and fourth testing periods. The measured air flow recorded for each of the first and second mass air flow sensors is compared to predetermined operating characteristics expected to be recorded in the first, second, third and fourth testing periods. Generally, the predetermined operating characteristics expected to be recorded in the first, third and fourth testing periods comprise air flow below a near zero threshold. Predetermined operating characteristics expected to be recorded in the second testing period comprise air flow within an expected operating range. Respective fail counters can be incremented for each bank for each of the first, second, third and fourth testing periods where the measured air flow recorded is not consistent with the predetermined operating characteristics expected to be recorded. The results stored in each fail counter are combined to form a bit result, and the bit result is matched to one or more potentially failed or incorrectly installed components.

The diagnostic test can further include recording an average air flow at both the first and second mass air flow sensors during the first and second testing periods and using the calculated delta air flows to determine whether first and second mass air flow sensors are operating properly.

A fifth testing phase for the diagnostic test is also described, comprising a fifth delay period and a fifth testing period wherein the air pump remains deactivated, but the first and second check valves are opened while engine speed is increased. Measured air flow is recorded from each of the first and second mass air flow sensors during the fifth testing period, and compared to an expected operating range. The test includes determining one or more failure modes of the system based on the output from the five testing phases.

The present disclosure also provides a secondary air system comprising an air pump, a first and second air flow measuring means connected to the air pump, a first and second air flow control means respectively connected to the first and second air flow measuring means, defining first and second banks of the secondary air system and a plurality of fail counters for recording the results, for each bank, of each phase of the above described diagnostic test.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention. Specifically, although an exemplary secondary air system is described herein, it should be understood that in a broader sense, the specific components referred to herein could be substituted by other, similar means. For instance, the MAF sensors might be replaced with delta-pressure sensors, or any air flow measuring means, and the vacuum operated check valves replaced with electronically operated check valves, or other air flow control means.

BRIEF DESCRIPTION OF THE DRAWINGS

FIG. 7 is a table for identifying failed and incorrectly installed components according to the results of the FIG. 4 diagnostic test.

FIG. 35 is an exemplary embodiment of Secondary Air Diagnostic Hierarchy & Fault Maturation Summary guide.

DETAILED DESCRIPTION

Figure 1:
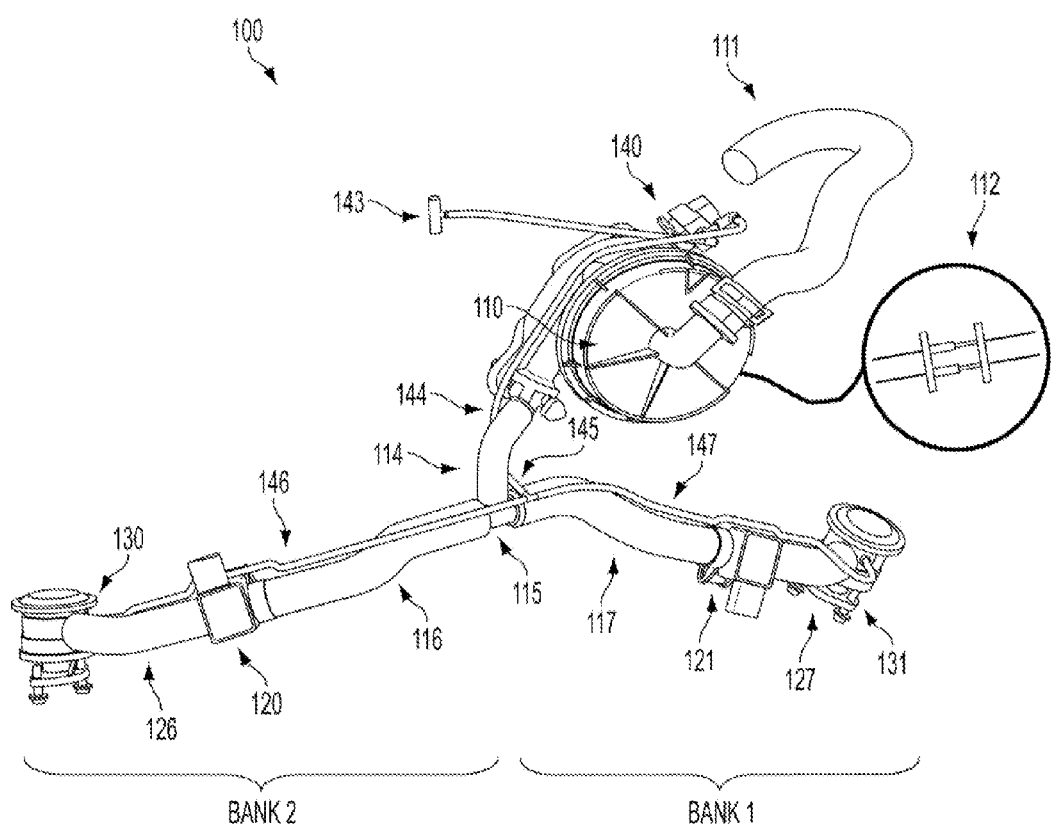
FIG. 1 is a schematic of an exemplary secondary air system.

In one form, the present disclosure provides a secondary air system diagnostic test which allows for fast identification of failed or incorrectly installed components during the assembly process. The test is capable of verifying desired installation and operation of single and multiple bank air systems, wherein a single-bank system may include an air pump, a check valve and a mass flow sensor either upstream or downstream of the air pump. The test is capable for use with systems having vacuum or electronically operated check valves. For a two-bank system, for example, the test is capable of verifying proper installation and operation of the vacuum solenoid, air pump, two mass air flow (MAF) sensors, and two check valves, as well as all junctions, hoses and pipes between the components. The test utilizes data from the secondary air system's MAF sensor(s) to detect any electrical and mechanical failures. It is contemplated the test can utilize a plurality of predetermined diagnostic trouble codes (DTC) depending on a particular system configuration and to what extent data output is thought to be required to aid in narrowing and identifying failure modes including parts and their locations. This test can be utilized in-plant and post-plant. The DTCs can be determined by the vehicle manufacture and/or by another outside entity.

The secondary air system diagnostic test is generally divided into four phases: Init (A), Flow (B), FlowBlock (C) and End (D). Each phase comprises a predetermined calibratable delay time and predetermined calibratable test time. The results of each phase are collected in a series of pass and fail counters for each bank, which define acceptable or desired operating ranges during each phase. The desirable operating ranges are predetermined for each secondary air system test phase. Generally, in the Init (A), FlowBlock (C) and End (D) phases, the results are compared to not-to-exceed thresholds, whereas the Flow (B) phase tests that the system is properly outputting secondary air in a desired operating range. The strength in this test lies not in evaluating each phase individually, but in analyzing the results of all four phases simultaneously to aid in narrowing a failure mode, such as a particular part and its location in the system. The capability to detect the actual failure or narrowing the potential locations of failures (incorrectly installed components, defective components, etc.) reduces replacing parts that may not be defective (because it is unknown which of say one or more parts causes the failure) and minimizes the time spent trouble shooting/testing to determine and locate the failure.

The first phase of the test, Init (A) testing time (period), begins after a predetermined calibratable first delay time (period), which allows for ramp up time of air pump flow, time to reach a steady state condition, etc. The Init (A) phase ensures that the check valves are at rest state (closed), vacuum solenoid is in a closed state, air supply hoses are not disconnected, and MAF values are not locked within normal operating range. During the Init (A) phase, the vacuum solenoid and both check valves are at rest (and thus should be properly closed) and the air pump is commanded to activate. In normal operation, no air flow should exit the secondary air system in the Init (A) phase because even though the air pump is turned on, the check valves are closed.

The Init (A) phase is considered passed so long as the MAF sensors in each bank do not report air flow in excess of a calibrated threshold, which for the Init (A) phase is generally near zero, plus a margin of error. If air flow exceeds the threshold in one or both banks, one or both fail counters are incremented. If a reading first exceeds but later falls below the threshold, the fail counter will decrement. To check proper operation of the MAF sensors, data samples (generally three) are separately collected and averaged.

The second phase of the test, Flow (B) period, begins after the Init (A) phase ends and after a calibratable second delay period, which is generally small since air pump will already be operating at full operating speed. The Flow (B) phase ensures that vacuum solenoid is not at the rest state (closed), check valves are not at the rest state (closed), hoses are not disconnected, air pump is operating to capacity, and vacuum hoses are not disconnected. During the Flow (B) phase, the check valves are opened via the vacuum solenoid. In normal operation, air flow will properly exit the secondary air system in the Flow (B) phase because the air pump is running and the check valves are open. In addition, if all hoses and junctions are properly sealed, the MAF sensors should be reporting roughly equal air flow mass.

The Flow (B) phase is considered passed so long as the MAF sensors report air flow that is within a calibrated range, which for the Flow (B) phase is, in one exemplary embodiment, generally between 4.0 and 8.0 g/s, for a given exemplary two-bank system. Because normal operation is within this range, there are two fail counters for each back, one to detect an upper excursion from the range—a 'high flow' fail counter—and one to detect a lower excursion from the range—a 'low flow' fail counter. If air flow exceeds the range in one or both banks, one or both 'high flow' fail counters are incremented. Likewise, if air flow is below the range in one or both banks, one or both 'low flow' fail counters are incremented. If a reading first exceeds but later respectively falls below the high threshold, the respective fail counter will decrement as long as the failure condition does not exist. Likewise for the 'low flow' fail counter, if the reading first is below the low threshold but later exceeds, the respective 'low flow' fail counter will decrement. This is done so that failure is reported based on consistently failing conditions, i.e., not temporary spikes or transients. To check proper operation of the MAF sensors, data samples (generally three) are again collected and averaged.

The averaged MAF data from both the Flow (B) and Init (A) phases is used to conduct a rationality check, thus determining if the MAF sensors are operating properly. The change in flow between the Flow (B) and Init (A) phases must exceed a certain amount, or a fail condition will be recorded.

The third phase of the test, FlowBlock (C), begins after the Flow (B) phase ends and after a calibratable third delay, which is needed for check valve transition and air flow bleed-off. The FlowBlock (C) phase ensures that check valves will close after being opened in the Flow (B) phase, and that vacuum solenoid will close after being opened in the Flow (B) phase, and will aid in confirming that hoses are not disconnected. During the FlowBlock (C) phase, the air pump continues to run, but the check valves are closed via the vacuum solenoid. In normal operation, air flow will be blocked because the check valves are now closed, even though the air pump continues to run.

The FlowBlock (C) phase is considered passed so long as the MAF sensors in each bank do not report air flow in excess of a calibrated threshold, which for the FlowBlock (C) phase is generally near zero, plus a margin of error. If air flow exceeds the threshold in one or both banks, one or both fail counters are incremented. If a reading first exceeds but later falls below the threshold, the fail counter will decrement.

The last phase of the test, End (D), begins after the FlowBlock (C) phase ends and after a calibratable fourth delay, needed to ensure bleed-off. The End (D) phase aids in detection of an open vacuum solenoid, open check valves and air supply hoses being disconnected. During the End (D) phase, the pump is turned off and the check valves remain closed. No airflow detection is expected. This phase is used to help pinpoint the root cause of the problem, for example, whether a check valve is stuck open or a hose disconnected.

The End (D) phase is considered passed so long as the MAF sensors in each bank do not report air flow in excess of a calibrated threshold, which for the End (D) phase is, like the FlowBlock (C) phase, generally near zero, plus a margin of error. If air flow exceeds the threshold in one or both banks, one or both fail counters are incremented. If a reading first exceeds but later falls below the threshold, the fail counter will decrement.

Like in the Init (A) and Flow (B) phases, MAF data samples can be collected to determine average air flow rates and change during the FlowBlock (C) and End (D) phases. This data can be useful in further aiding guidance to the root cause, such as when there are multiple simultaneous issues, i.e., a stuck open check valve and an air pump stuck on or off.

In exemplary implementations, the above-described four phase test can be run in less than 9 seconds, and can be performed as part of the two minute engine running emissions test that is commonly performed during vehicle assembly, and can be configured with a calibratable delay time to activate at a particular time during the more comprehensive engine test. The test can also be controlled by a plurality of enabling conditions, which determine if the test will run at all, including whether the engine controller is in in-plant mode, the vehicle is properly in park or neutral, the vehicle battery voltage is above a threshold voltage, and the catalytic converter temperature is below a cut-off threshold, to protect from damage.

A sampling of conditions that the above-described four-phase test can detect include: air pump electrically disconnected, air pump mechanically stuck off, vacuum solenoid electrically disconnected, vacuum solenoid mechanically stuck closed, manifold vacuum disconnected, vacuum hoses reversed at vacuum solenoid, any vacuum hose(s) disconnected (including at tee to purge solenoid), MAF sensor value stuck at any fixed value, air supply hose disconnected before check valves, air supply hose disconnected after check valves, check valve(s) stuck open, check valve(s) stuck closed, check valve opens, then stuck open, air supply hose between MAF and check valve with leak as small as, for example, 4 mm diameter, air supply hoses fully restricted, mass air flow sensors installed backwards, rigid pipe disconnected after check valve, both rigid pipes disconnected after check valves, air pump stuck on, bank to bank flow variation, and even restrictions in air supply hoses (less than full restriction) and leaks in air supply hoses before MAF sensors (less than fully disconnected). The conditions are detected based on an analysis of the fail counters collected from all four phases of the test. For instance, a bank one check valve mechanically stuck closed will trigger a 'low flow' fail counter for bank one's MAF sensor and a 'high flow' fail counter for bank two's MAF sensor in the Flow (B) phase, but otherwise pass all other phases. In another instance, a bank one check valve stuck closed due to a vacuum hose disconnected will trigger a 'low flow' fail counter for bank one's MAF sensor and a 'low flow' fail counter for bank two's MAF sensor in the Flow (B) phase, but otherwise pass all other phases.

The fail counters from each phase plus the two MAF rationality comprise a 12-bit result, which can then be compared to, e.g., a lookup table to identify one or more components that have failed or are improperly installed. When more than one component is identified, e.g., the air pump may be wired backwards or an air hose may be disconnected at the T-junction between banks, a further analysis of the recorded test results must be conducted. The recorded data is compared to known characteristics of each condition to ultimately narrow the potential components to a smallest list possible. For instance, in the Flow (B) phase, it is known that a backwards-wired air pump will produce air flow of approximately 3.0 g/s in both banks, while a disconnected air hose (prior to the MAF) will produce air flow of approximately 1.0 g/s in both banks, and an air flow of greater than 1.0 g/s if the hose disconnection is after the MAF.

The test can also incorporate timers which increment when a test phase is started and stopped when the air flow is measured below a near-zero threshold, for example below 0.29 g/s. The time it takes for air flow to bleed off to near zero in the FlowBlock (C) or End (D) phases can help determine the size of a leak, if a check valve is stuck open or if a hose is disconnected.

In another form, the present disclosure provides a five-phase diagnostic test which replicates the above described four-phase test but adds an additional PrePost (E) phase to detect two additional conditions: air pump stuck on and check valve/exhaust transfer pipe disconnection. The PrePost (E) phase begins after the End (D) phase and after a calibratable fifth delay needed for an increase in engine RPM and opening of check valves. In the PrePost (E) phase, the air pump remains off and the check valves are opened via the vacuum solenoid. Engine RPMs are increased to between 1600-2000 RPM, aspirating the engine, to better detect a fault in the banks with greater air flow.

Similar to the Flow (B) phase, the PrePost (E) phase is considered passed so long as the MAF sensors report air flow that is within a calibrated range, which for the PrePost (E) phase is lower than the Flow (B) phase. The range is generally between 0.6 and 4.0 g/s. Because normal operation is within this range, there are two fail counters for each bank, one to detect an upper excursion from the range—a 'high flow' fail counter—and one to detect a lower excursion from the range—a 'low flow' fail counter. If air flow exceeds the range in one or both banks, one or both 'high flow' fail counters are incremented. Likewise, if air flow is below the range in one or both banks, one or both 'low flow' fail counters are incremented. A high flow fail counter indicates a stuck on air pump, and a low flow fail counter indicates a check valve/exhaust transfer pipe disconnection. In the event of a condition where the "high flow" counter is incremented due to exceeding a "high flow" threshold and where a respective reading first exceeds but later falls below the threshold, the respective fail counter will decrement as long as the failure condition does not exist. Likewise for the 'low flow' fail counter, if the reading first is below the threshold but later exceeds, the respective 'low flow' fail counter will decrement. It should be noted that the addition of the PrePost (E) phase increases the test result to 14-bits, and any lookup table should be expanded accordingly.

Referring now to FIG. 1 illustrates an exemplary two-bank secondary air system 100 having an electromechanical air pump 110 connected to two mass air flow (MAF) sensors 120, 121, each connected to a respective check valve 130, 131. In the illustrated secondary air system 100, check valves 130, 131 are vacuum operated via connection to a vacuum solenoid 140.

Air pump 110, which is controlled via wiring 112, draws air in via air intake 111 and outputs it to air hose 114. Air hose 114 is connected to a T-junction 115, which splits the airflow to the two banks of the system 100. In bank 2, air hose 116 connects T-junction 115 to MAF sensor 120, which is connected to check valve 130 via air hose 126. In bank 1, air hose 117 connects T-junction 115 to MAF sensor 121, which is connected to check valve 131 via air hose 127.

Check valves 130, 131, as noted above are controlled by vacuum solenoid 140. Vacuum is input to solenoid 140 via vacuum hose 143 and output via vacuum hose 144. Vacuum hose 144 is connected to a T-junction 145, which splits the vacuum between check valves 130, 131 via vacuum hoses 146, 147, respectively.

Figure 2:
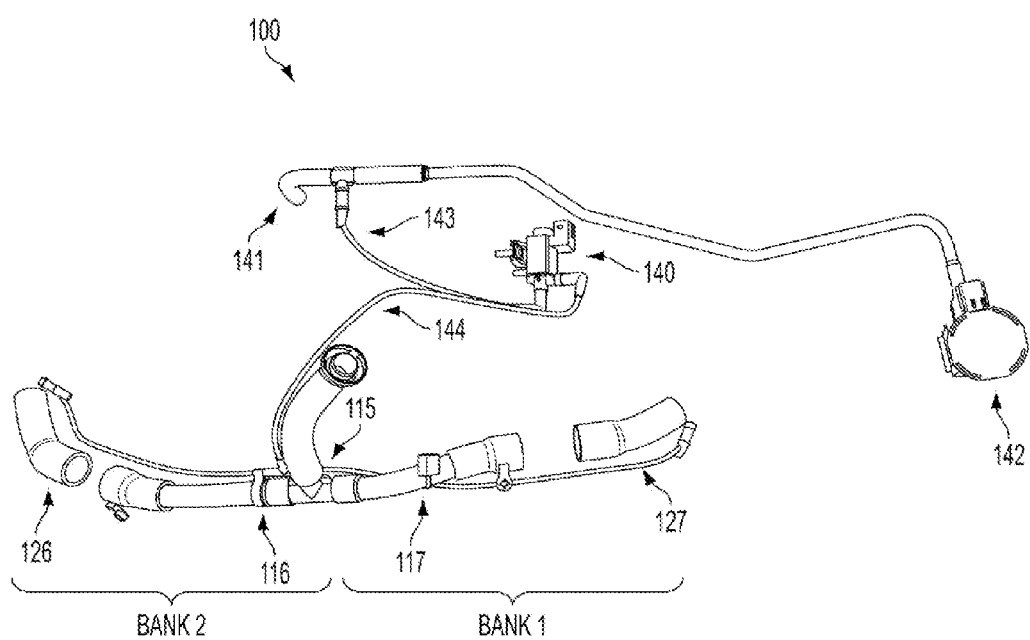
FIG. 2 is a schematic showing additional components of the FIG. 1 secondary air system.

FIG. 2 illustrates additional components of system 100, particularly the inputs to vacuum solenoid 140, and provides an additional view of air hoses 115, 116, 117, 126 and 127. A vacuum source 141 connects to both vacuum hose 143 (the input to vacuum solenoid 140) and a purge solenoid 142.

Figure 3:
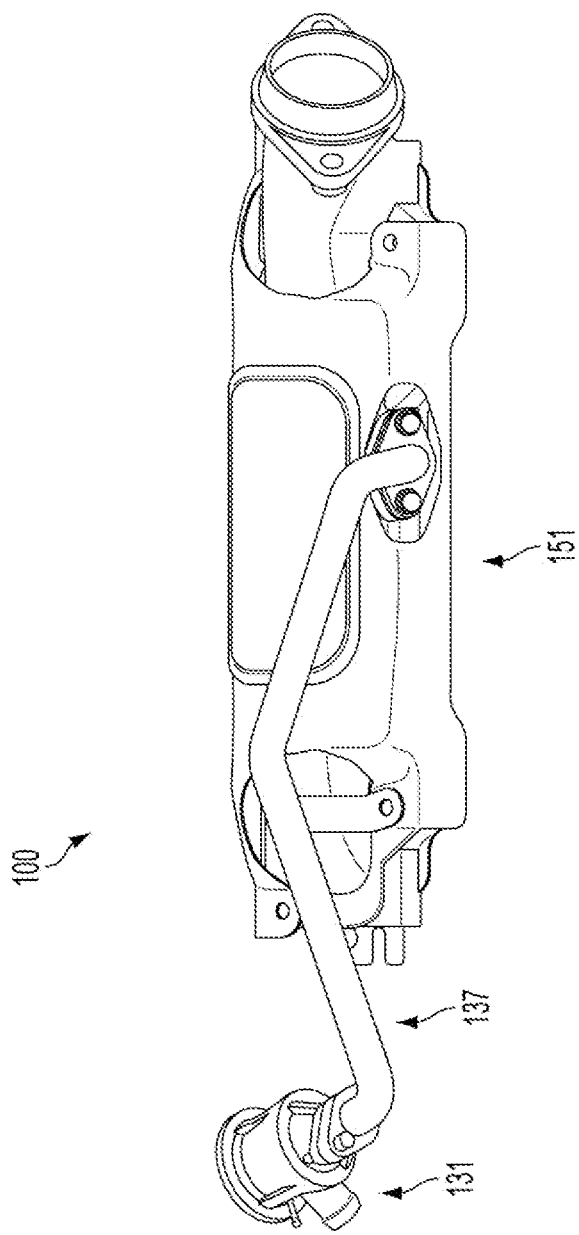
FIG. 3 is a schematic showing further additional components of the FIG. 1 secondary air system.

FIG. 3 illustrates the final stage of system 100, in which the check valves (131 is shown) connect via a rigid exhaust transfer pipe 137 to an exhaust manifold 151. It should be appreciated that there is a similar arrangement for check valve 130.

Figure 4:
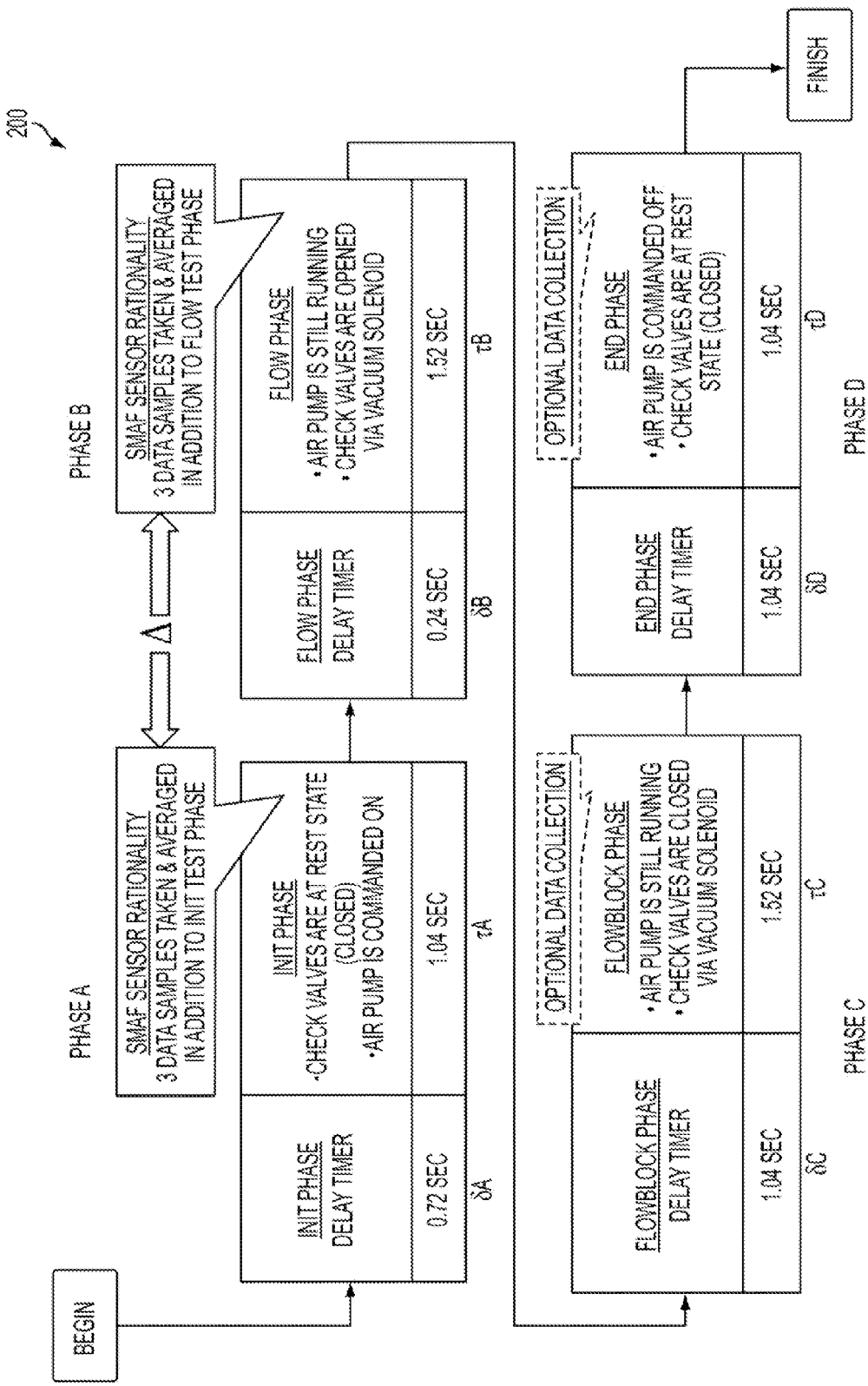
FIG. 4 is a chart showing one example of a diagnostic test for a secondary air system.

FIG. 4 illustrates an exemplary embodiment of the four-phase test 200 described above executing on system 100, which run in-plant, for example, during an engine emissions test. In the Init (A) phase, a calibratable delay time period of δA, which is generally in the range of 0.72 seconds to allow for ramp up of air flow from air pump 110. In the testing period τA, the check valves 130, 131 are at rest and closed and the air pump 110 is commanded on. Generally, τA is in the range of 1.04 seconds. Further, during the Init (A) phase, a number of measurement samples are taken from the MAF sensors 120, 121 and the samples from each sensor are averaged for each sensor during phase A.

Once the Init (A) phase A completed, the Flow (B) phase begins with a calibratable delay time period 6B, which is generally a very short time period in the range of 0.24 seconds that allows sufficient time for check valves 130, 131 to open. In the testing period τB, which is in the range of 1.52 seconds, air flow through open check valves 130, 131 is measured. Again, during the Flow (B) phase, a number of measurement samples are taken from the MAF sensors 120, 121 and the samples from each sensor are averaged to provide a baseline for each sensor during the Flow (B) phase. The calculated average from Flow (B) phase is compared to the calculated average from Init (A) phase to establish a Delta (Δ). If Delta (Δ) exceeds a calibrated threshold value, the MAF sensors can be considered to be operating properly.

After the Flow (B) phase ends, the FlowBlock (C) phase begins with a calibratable delay time period of δC in the range of 1.04 seconds, which ensures sufficient time for check valves 130, 131 to close. In the testing period τC, which is in the range of 1.52 seconds, air flow through closed check valves 130, 131 (which should be near zero) is measured.

The last of the four phases, the End (D) phase, proceeds after the end of testing period τC. Another calibratable delay time period of δD provides sufficient time for air pump 110 to spin down, and testing period τD checks to make sure air flow is still near zero. The optional data collection during the FlowBlock (C) and End (D) phases is also shown.

Figure 5:
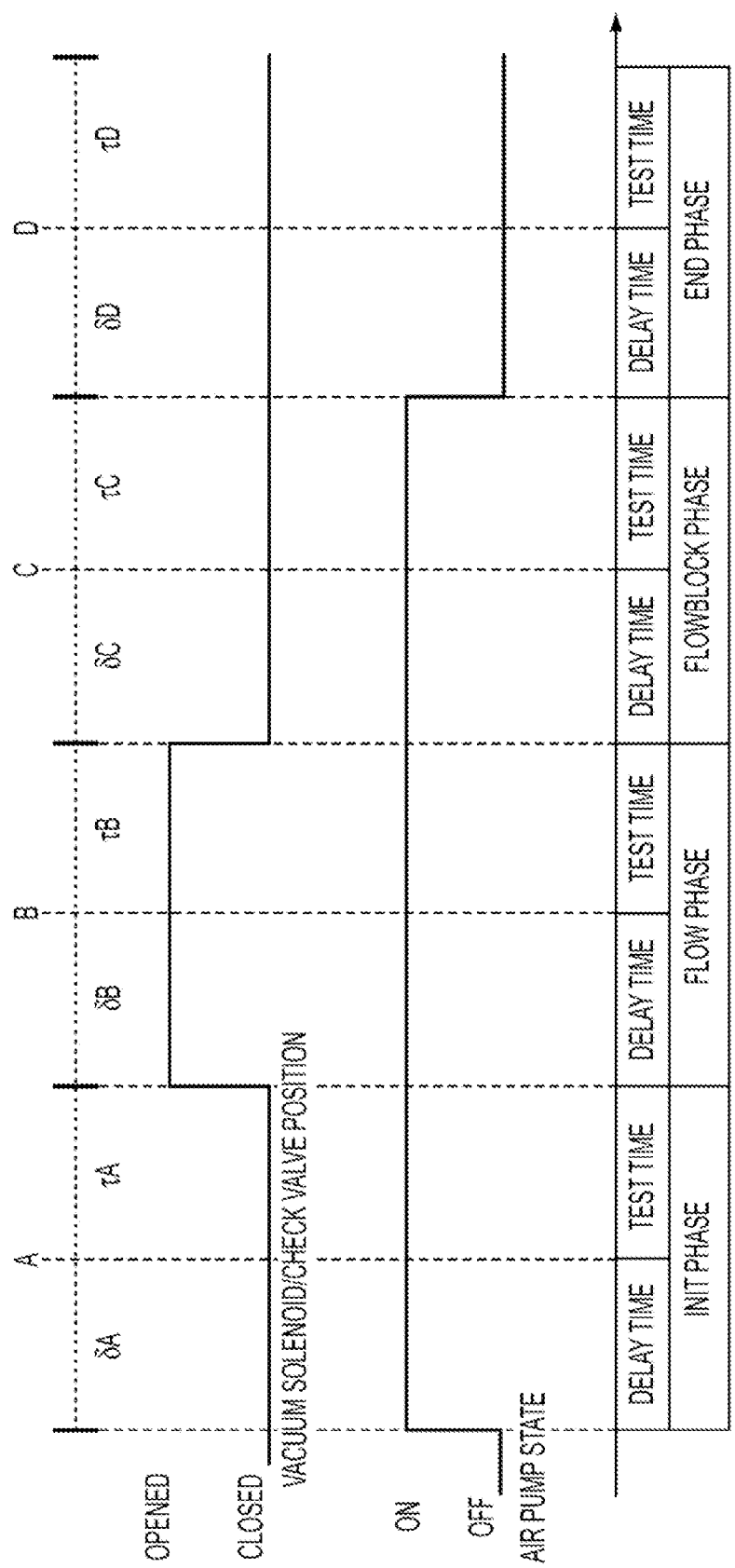
FIG. 5 is a timing diagram corresponding to the FIG. 4 diagnostic test.

FIG. 5 shows the state of air pump 110 and check valves 130, 131 during the four phases A, B, C, and D.

Figure 6:
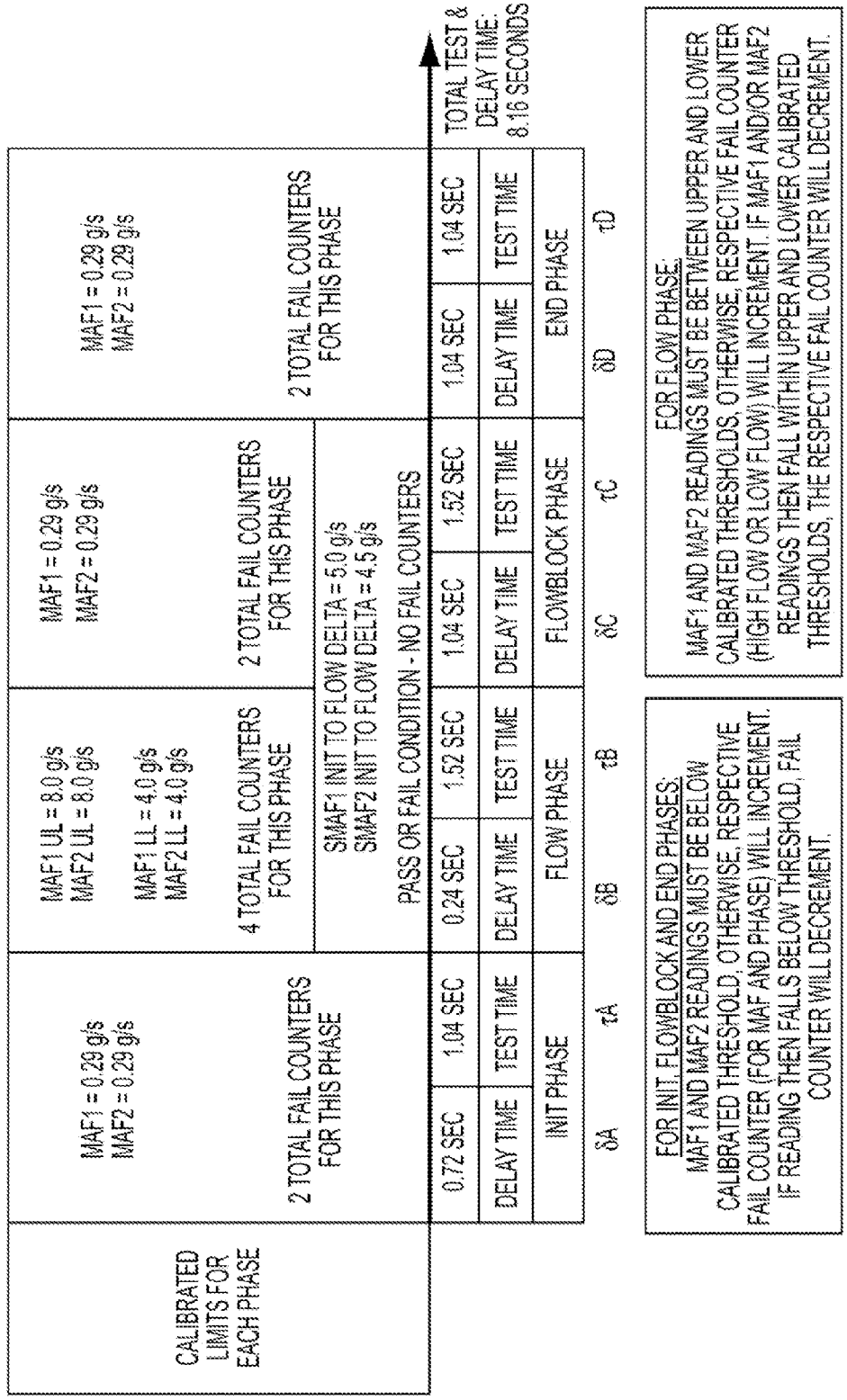
FIG. 6 is a diagram illustrating exemplary testing parameters of the FIG. 4 diagnostic test.

FIG. 6 illustrates the various measurement thresholds and fail counters during the four phases A, B, C, and D. In the Init (A) phase, air flow should be near zero, e.g. in the range of 0 to 0.29 g/s. If air flow exceeds 0.29 g/s in either or both MAF sensors 120, 121, fail counters will increment for the respectively failing bank(s). In the Flow (B) phase B, air flow should be between 4.0 and 8.0 g/s through both banks. If air flow is above 8.0 g/s at either MAF sensor 120, 121, 'high flow' fail counters will increment for the respectively failing bank(s). If air flow is below 4.0 g/s at either MAF sensor 120, 121, 'low flow' fail counters will increment for the respectively failing bank(s). For instance, inconsistent but still passing air flow at MAF sensors 120, 121 in the Flow (B) phase, i.e., where one bank is higher, on average, indicates a partial blockage in one of air hoses connecting MAF sensors 120, 121 to the air pump 110.

In both the FlowBlock (C) phase and End (D) phase, air flow should be near zero (0.29 g/s). If air flow exceeds 0.29 g/s in either or both MAF sensors 120, 121 in either phase, appropriate fail counters will increment for the respectively failing bank(s). Additionally, a comparison is performed between the MAF sensor 120, 121 averages obtained in phase A (Init) and phase B (Flow) to conduct a rationality check on the MAF sensors 120, 121. If the delta air flow between phases A and B in each MAF sensor 120, 121 does not exceed 5.0 g/s for Bank 1 and does not exceed 4.5 g/s for Bank 2, it can indicate a failure of one or both of the MAF sensors 120, 121.

Figure 7:
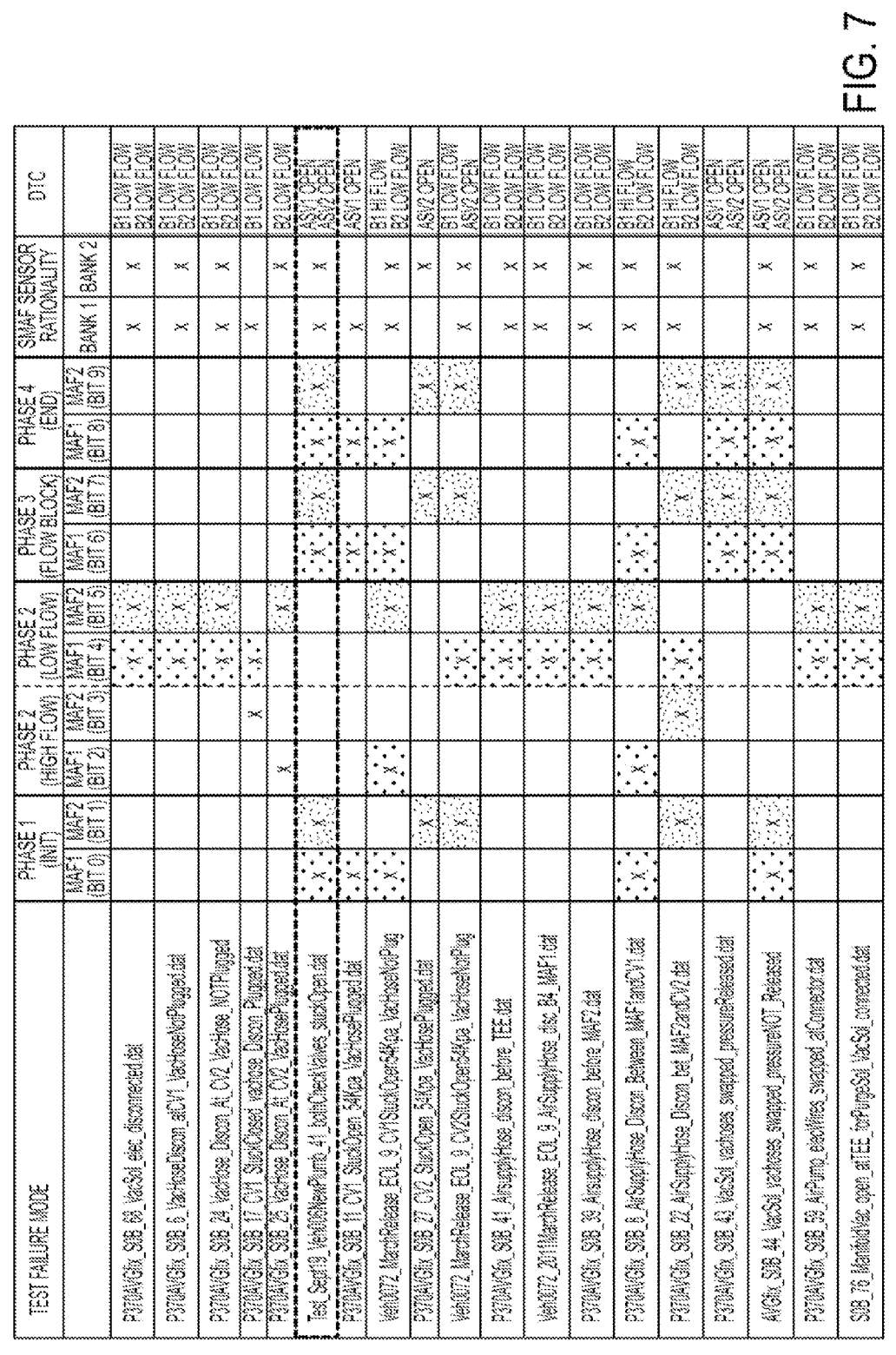

Together, the results of the fail counters and rationality check provide a 12-bit result output that can be analyzed with corresponding potential of failure modes. Such an exemplary table is illustrated in FIG. 7, showing fault or bit data in each testing phase and a listing of potential fault descriptions and identifying observed, i.e., failure points or failure modes. As can be seen in the circled line in FIG. 7, for instance, when both check valves are stuck open, phases A, C and D will report failures for both banks, denoted by the faults (X) in the phases, under the SMAF senor rationality column and the DTCs for a given Test Failure Mode, here in the dark, dashed line circled. Though not shown in the FIG. 7 chart, a properly operating secondary air system would produce no faults or failure modes.

Figure 8:
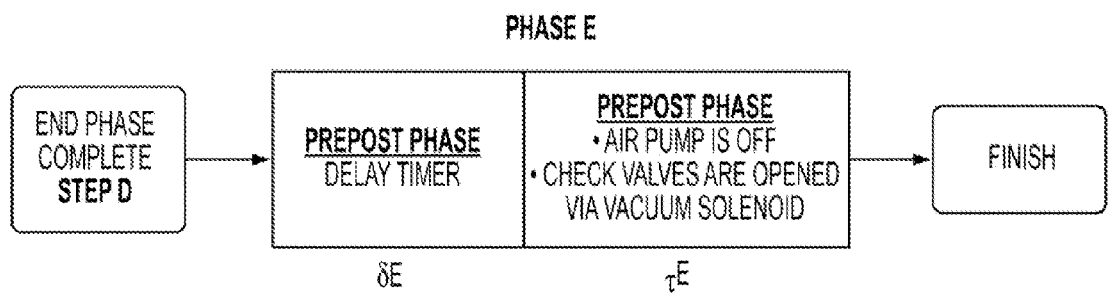
FIG. 8 is a chart showing an additional testing phase for the FIG. 4 diagnostic test.
Figure 9:
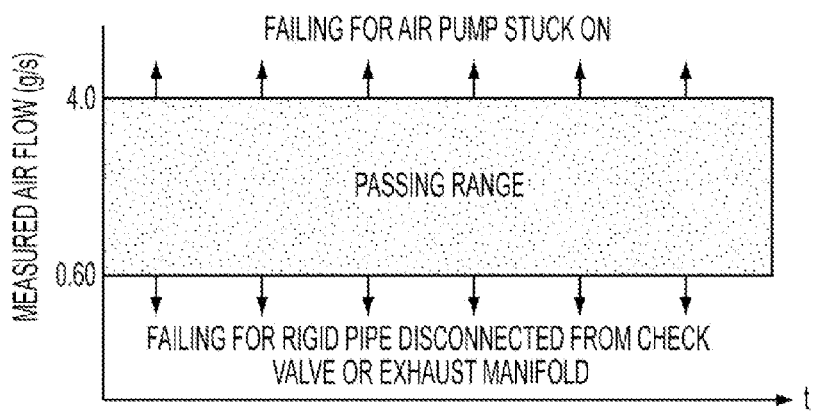
FIG. 9 is a diagram illustrating exemplary testing parameters of the FIG. 8 additional phase.
Figure 10:
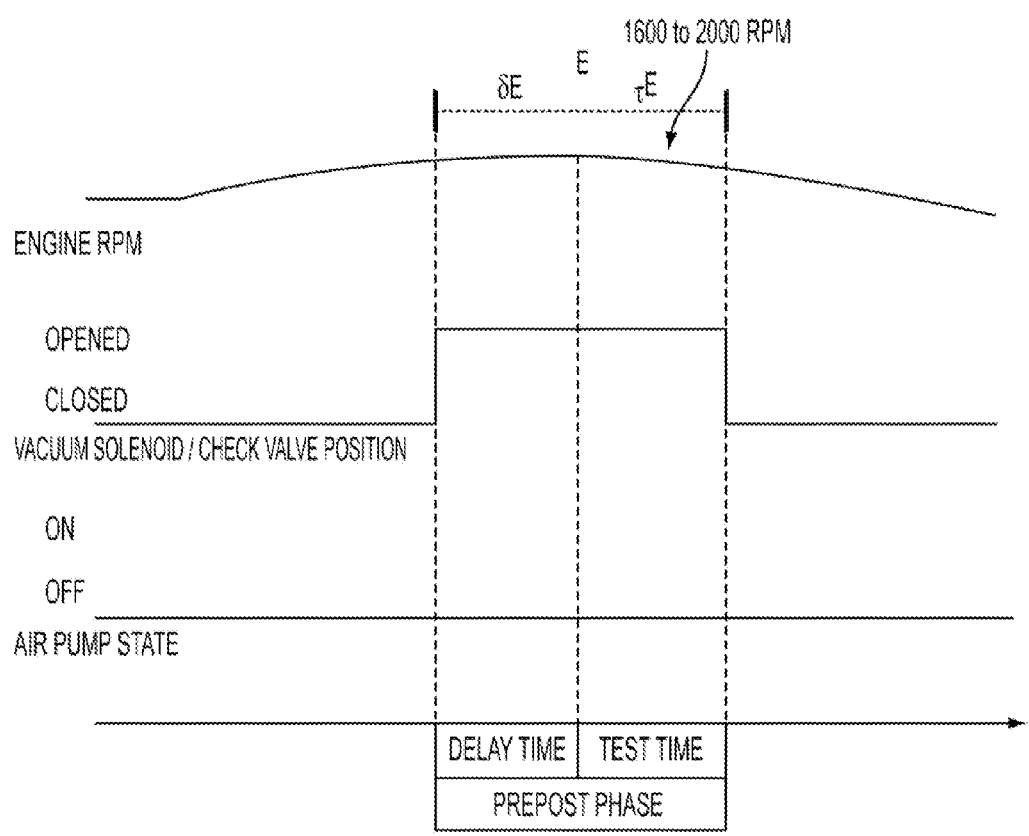
FIG. 10 is a timing diagram corresponding to the FIG. 8 additional phase.
Figure 11:
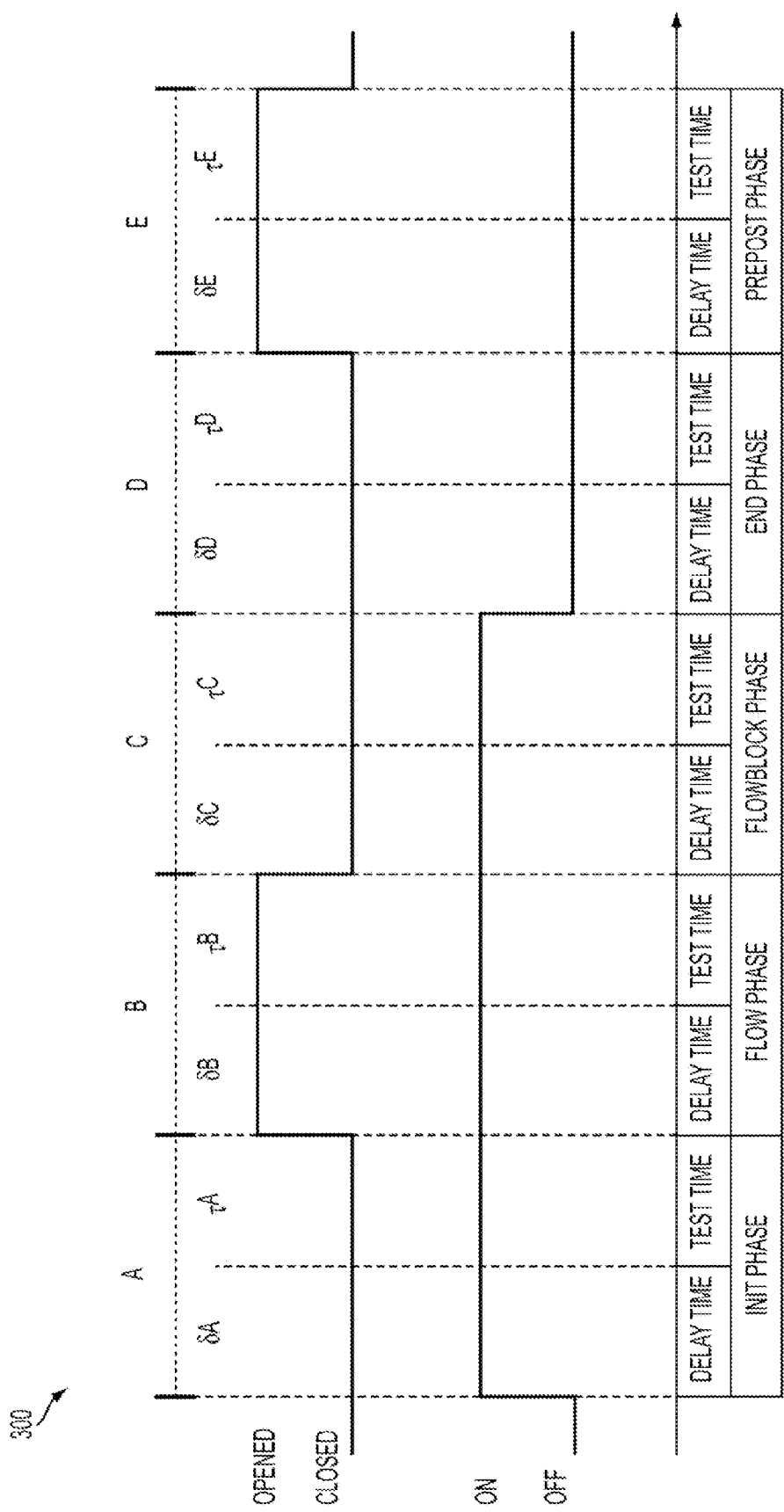
FIG. 11 is a timing diagram corresponding to the FIG. 4 diagnostic test with the FIG. 8 additional phase.

FIG. 8 illustrates the additional phase E (PrePost) discussed above. Generally, the time period necessary to complete phase E is in the range of 2.0 seconds. Air pump 110 remains off, while check valves 130, 131 are opened and the engine of the vehicle brought up to an increased rev cycle, optimally between 1600-2000 rpm. This results in some air flow through the system 100. As shown in FIG. 9, the proper operating range for phase E (PrePost) is between 0.60 g/s and 4.0 g/s. If 4.0 g/s is exceeded at one or both of MAF sensors 120, 121, the test indicates a stuck on air pump. If less than 0.6 g/s is detected at one or both of MAF sensors 120, 121, the respective rigid exhaust transfer pipe 136 is likely disconnected from either check valve 130, 131 or exhaust manifold 150. A timing diagram for phase E (PrePost) is shown in FIG. 10, including showing the increase in engine RPMs to the 1600-2000 rpm level. A timing diagram for a five-phase test 300 is shown in FIG. 11.

FIGS. 12-34 each illustrate operation of a secondary air diagnostic system, as described herein, with secondary air systems having a variety of operating characteristics. Each figure contains three plots: mass air flow through Bank 1's MAF sensor 121, mass air flow through Bank 2's MAF sensor 120, and a plot illustrating the delay and test timers. The two mass airflow plots show airflow in grams per second over time. The delay and test timer plots (bottom plot) shows the calibrated time on the vertical axis and the corresponding actual test time on the horizontal axis. The calibrated time is predetermined, for example, based on the system configuration including the size/complexity of the system, time to reach a steady state condition, components' configuration/complexity, amount of time thought required or desired to complete to test to locate the failure modes. In these FIGS. 12-34, the delay and test times for the phases correspond to those shown in the phases in FIG. 4, and are exemplary for the system 100.

Figure 12:
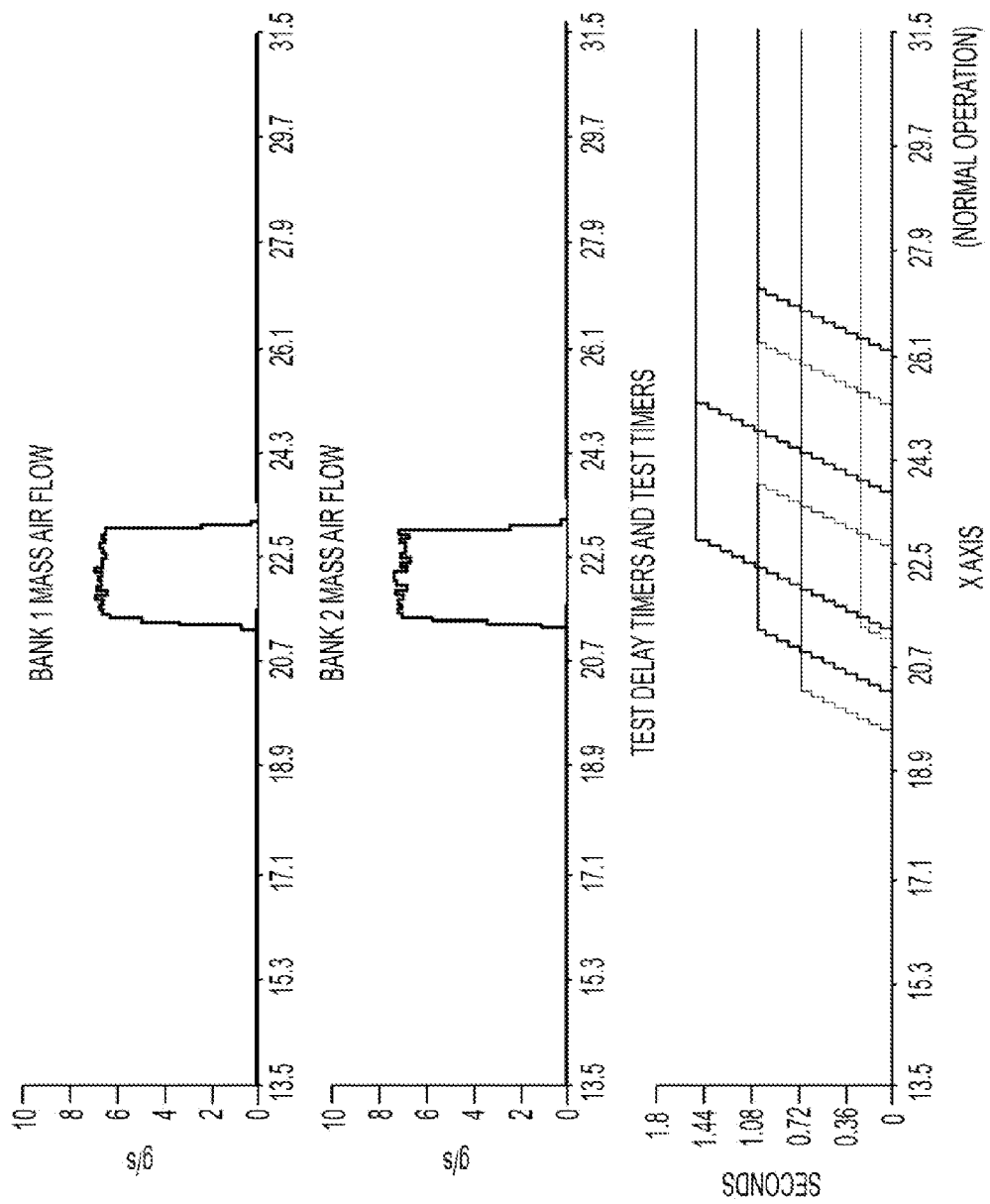
FIG. 12 is a graph showing normal operation of the FIG. 1 secondary air system during the FIG. 4 diagnostic test.

FIG. 12 shows results obtained from test 200 that indicate normal operation of system 100. As can be seen in FIG. 12, phase A proceeds with no air flow through MAF sensors 120, 121, while air pump 110 is spun up. As phase B begins and check valves 130, 131 are opened, air flow detected by MAF sensors 120, 121 quickly rises to a normal operating level of about 6.0 g/s. Once phase B ends, and check valves 130, 131 are closed in phase C, air flow through MAF sensors 120, 121 returns to near zero. Phase D, when air pump 110 is turned off, results in no change in air flow through MAF sensors 120, 121.

Figure 13:
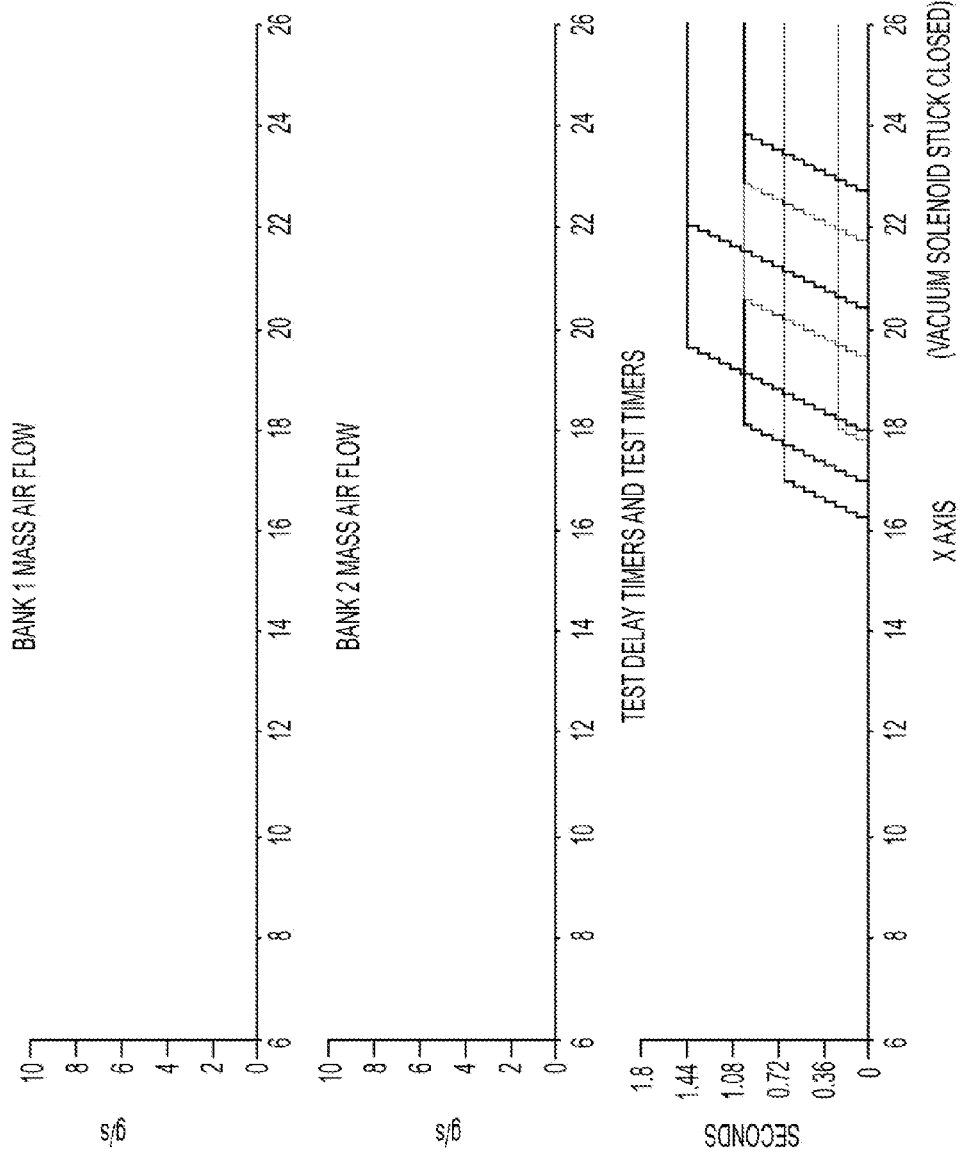
FIG. 13 is a graph showing results of the FIG. 4 diagnostic test for a FIG. 1 secondary air system with a vacuum solenoid stuck closed.

FIG. 13 shows results from test 200 when vacuum solenoid 140 is stuck closed. Since check valves 130, 131 will not open in this instance, no air flow through MAF sensors 120, 121 is detected at all. Phases A, C and D pass for both MAF sensors 120, 121, but phase B fails ('low flow') for both MAF sensors 120, 121.

Figure 14:
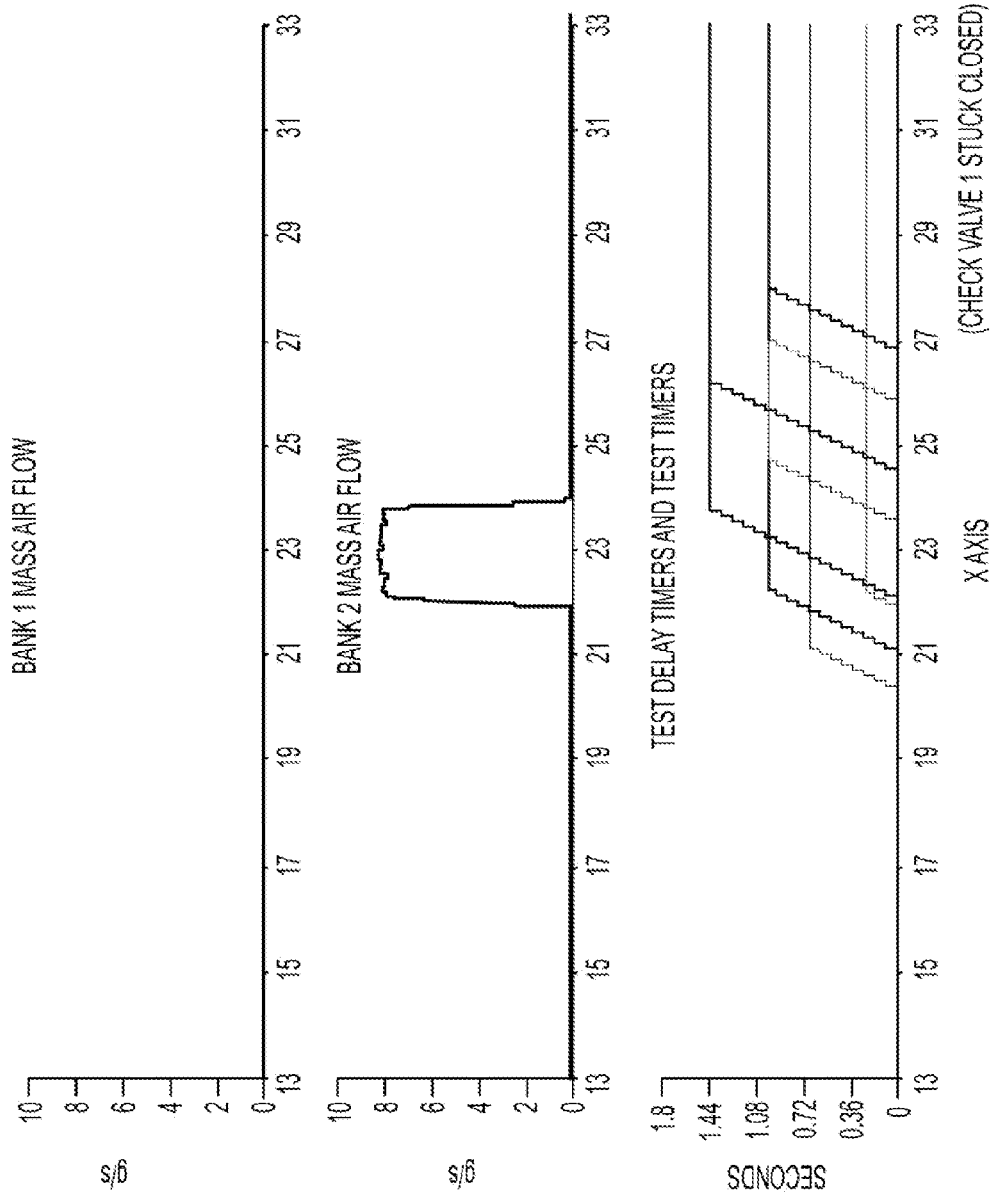
FIG. 14 is a graph showing results of the FIG. 4 diagnostic test for a FIG. 1 secondary air system with a first check valve stuck closed.
Figure 15:
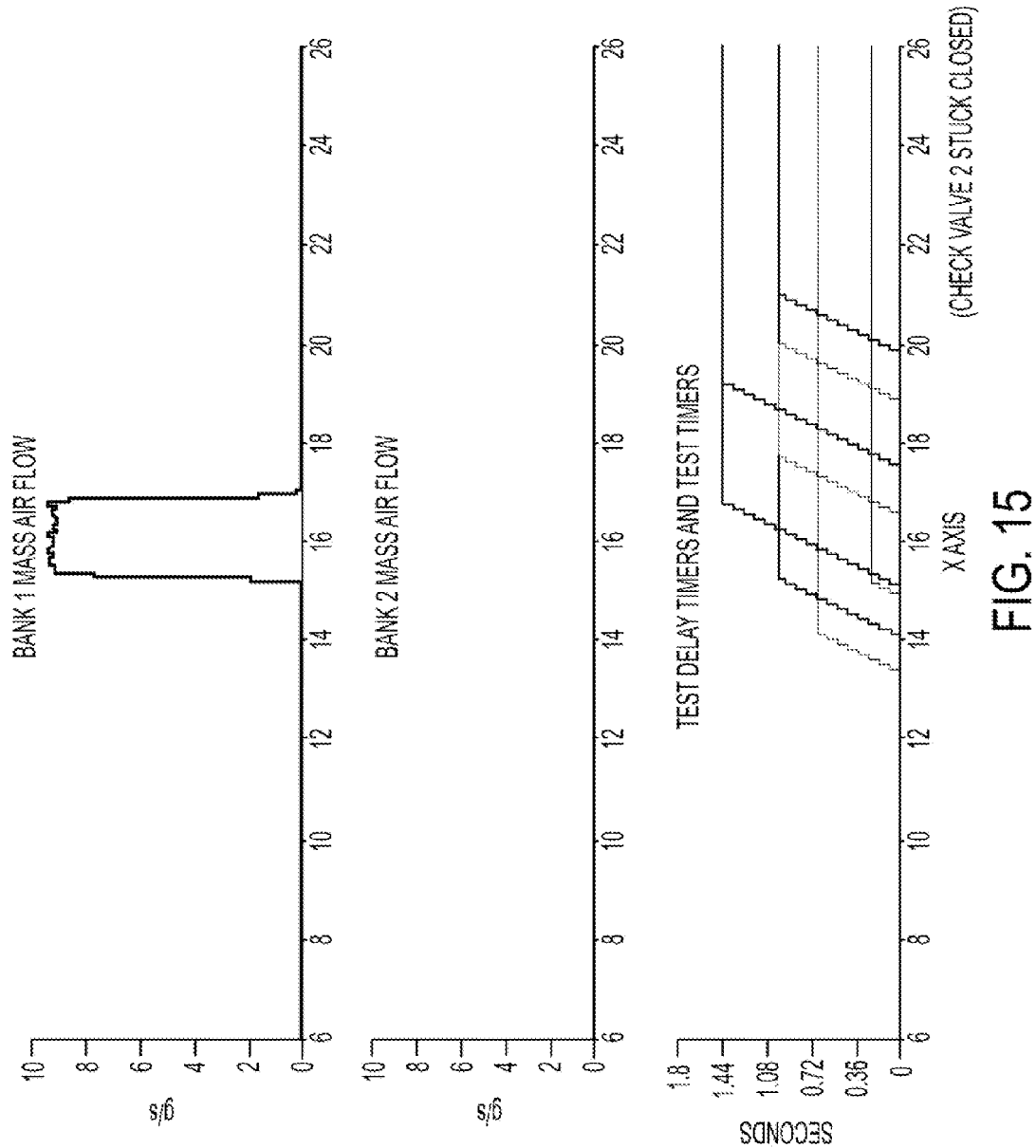
FIG. 15 is a graph showing results of the FIG. 4 diagnostic test for a FIG. 1 secondary air system with a second check valve stuck closed.

FIG. 14 shows results from test 200 when check valve 131 (bank 1) is stuck closed. Since check valve 131 is stuck closed and will not open, air flow through check valve 130 (bank 2) is increased. Again, Phases A, C and D pass for both MAF sensors 120, 121, but phase B records a 'low flow' for MAF sensor 121 (bank 1) and a 'high flow' for MAF sensor 120 (bank 2). FIG. 15 shows similar results when check valve 130 (bank 2) is stuck closed instead of check valve 131 (bank 1).

Figure 16:
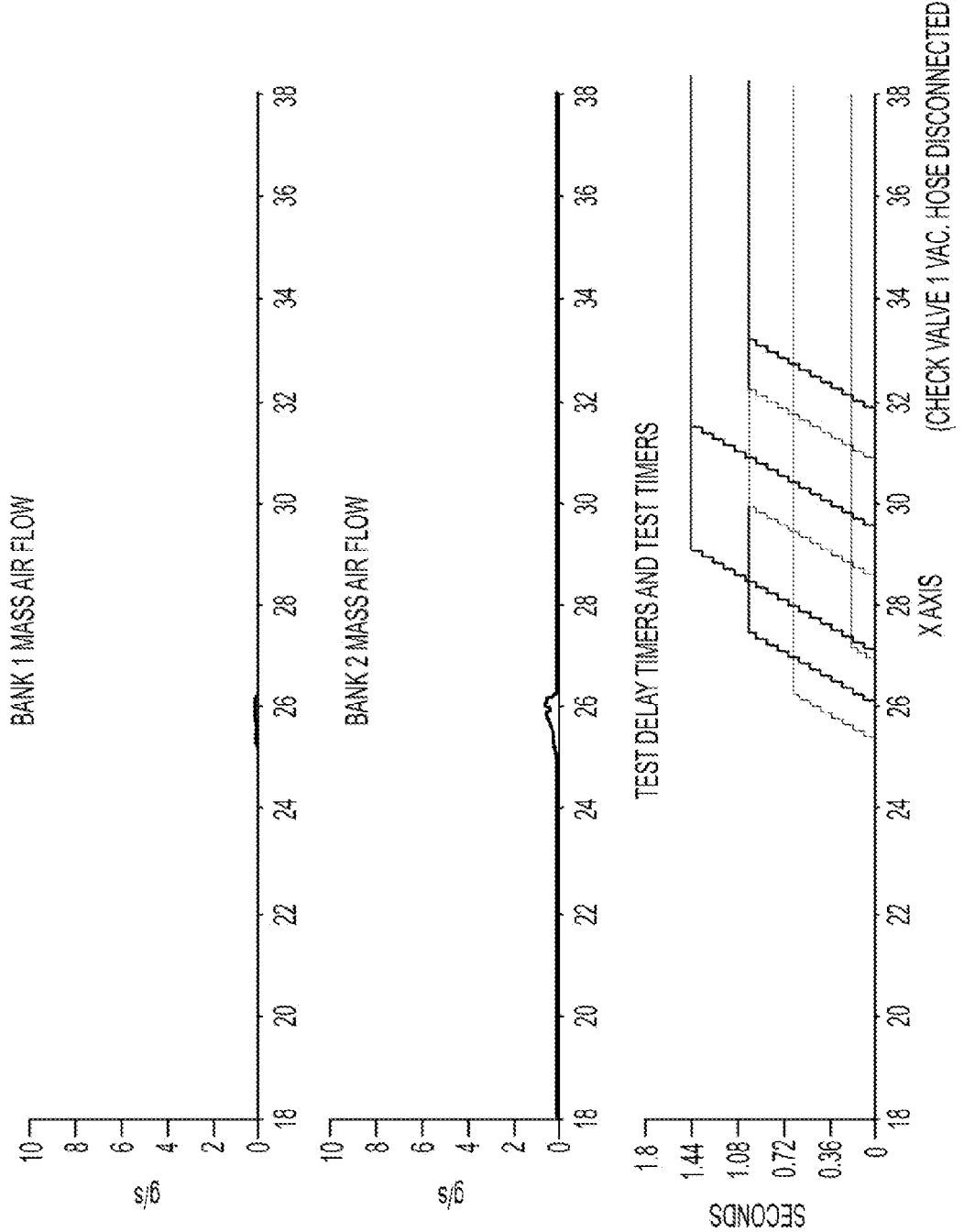
FIG. 16 is a graph showing results of the FIG. 4 diagnostic test for a FIG. 1 secondary air system with a first check valve's vacuum hose disconnected.
Figure 17:
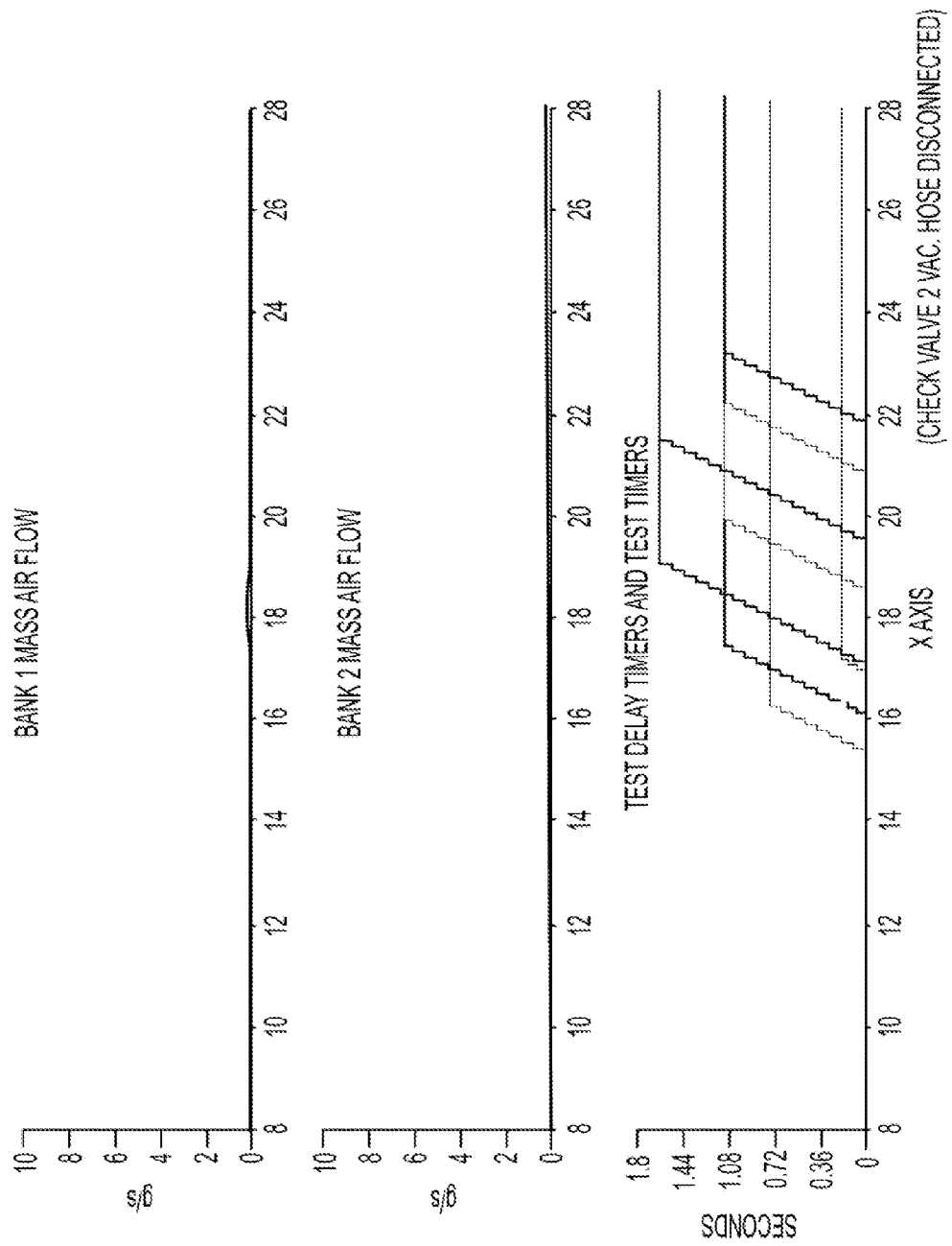
FIG. 17 is a graph showing results of the FIG. 4 diagnostic test for a FIG. 1 secondary air system with a second check valve's vacuum hose disconnected.

FIG. 16 shows results from test 200 when vacuum hose 147 is disconnected from check valve 131 (bank 1). Since there is a break in the continuity of vacuum distribution, check valve 130 (bank 2) does not receive enough vacuum to fully open. As a result, Phases A, C and D pass for both MAF sensors 120, 121, but phase B fails ('low flow') for both MAF sensors 120, 121. The disconnected vacuum hose can be detected from a further analysis of the data which shows some air flow through check valve 130 (bank 2), which does receive some vacuum (enough to partially open) via vacuum hose 146. FIG. 17 shows similar results when vacuum hose 146 is disconnected from check valve 130 (bank 2) instead.

Figure 18:
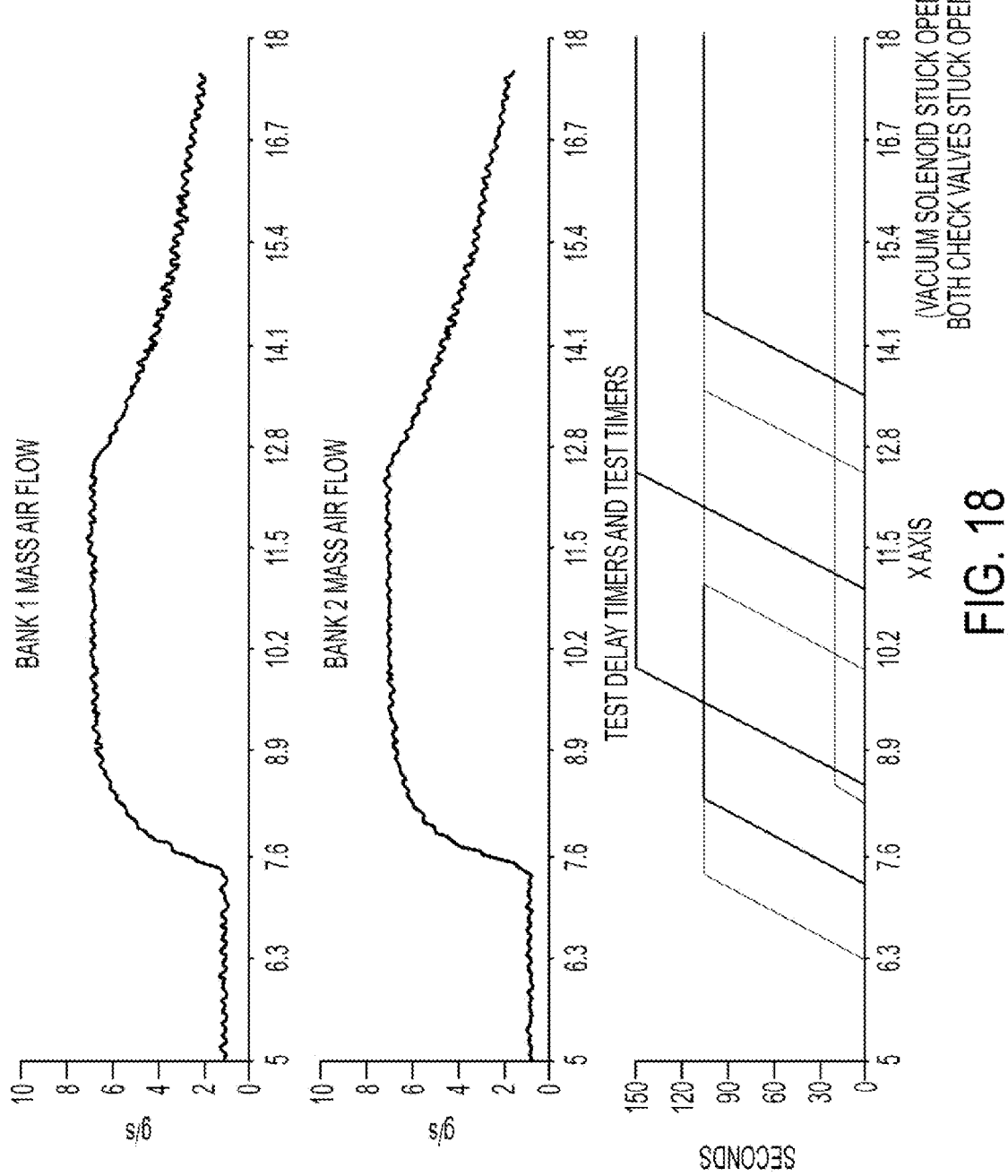
FIG. 18 is a graph showing results of the FIG. 4 diagnostic test for a FIG. 1 secondary air system with a vacuum solenoid stuck open or both check valves stuck open.

FIG. 18 shows results from test 200 when vacuum solenoid 140 is stuck open and thus both check valves 130, 131 are stuck open. Here, Phases A, C and D fail for both MAF sensors 120, 121, although phase B passes. As can be seen, air flow is above near-zero (from engine induced air flow) before the air pump 110 is turned on. Air flow then rises to near normal levels, before decreasing steadily as air pump 110 is turned off in phase D.

Figure 19:
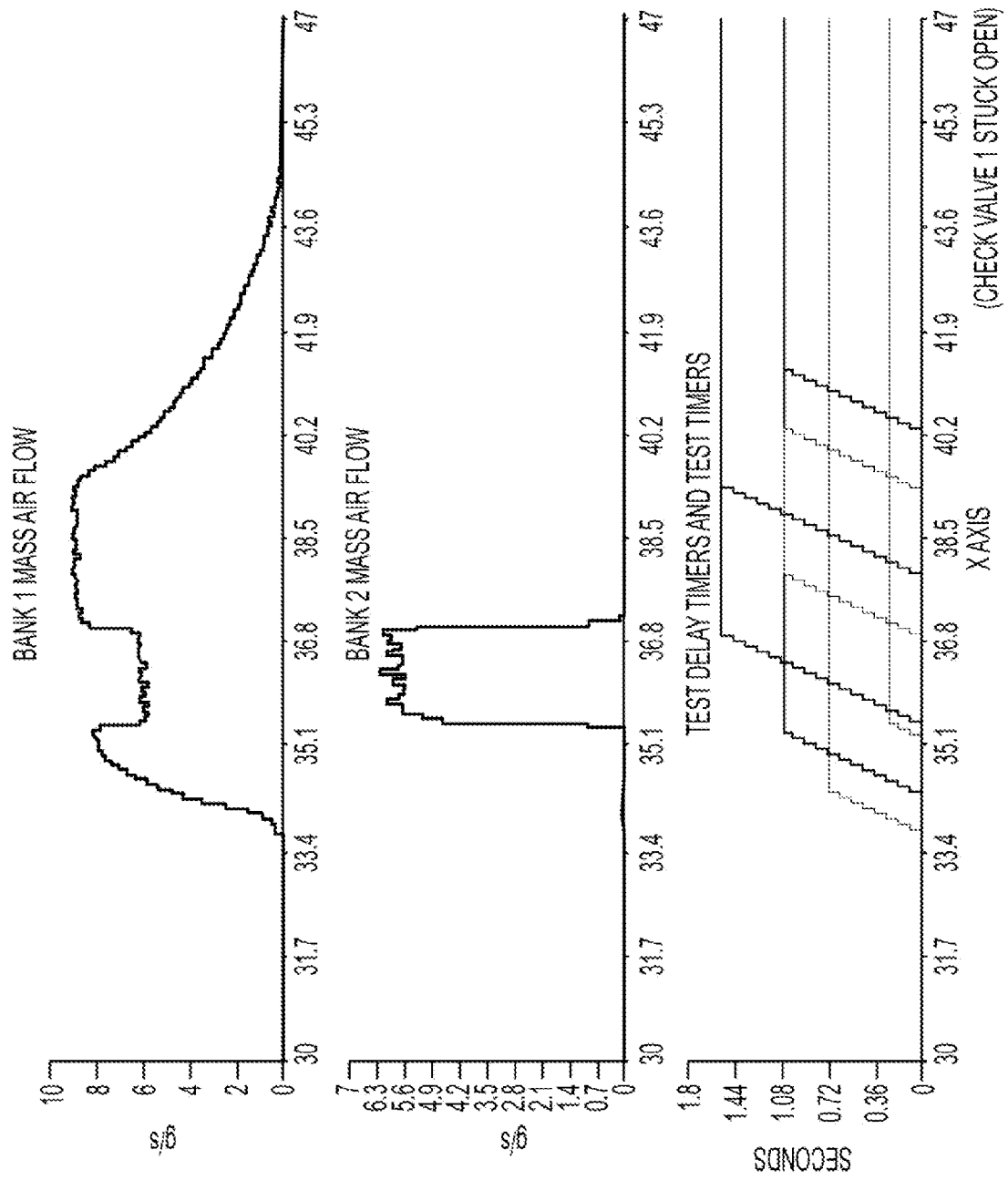
FIG. 19 is a graph showing results of the FIG. 4 diagnostic test for a FIG. 1 secondary air system with a first check valve mechanically stuck open.
Figure 21:
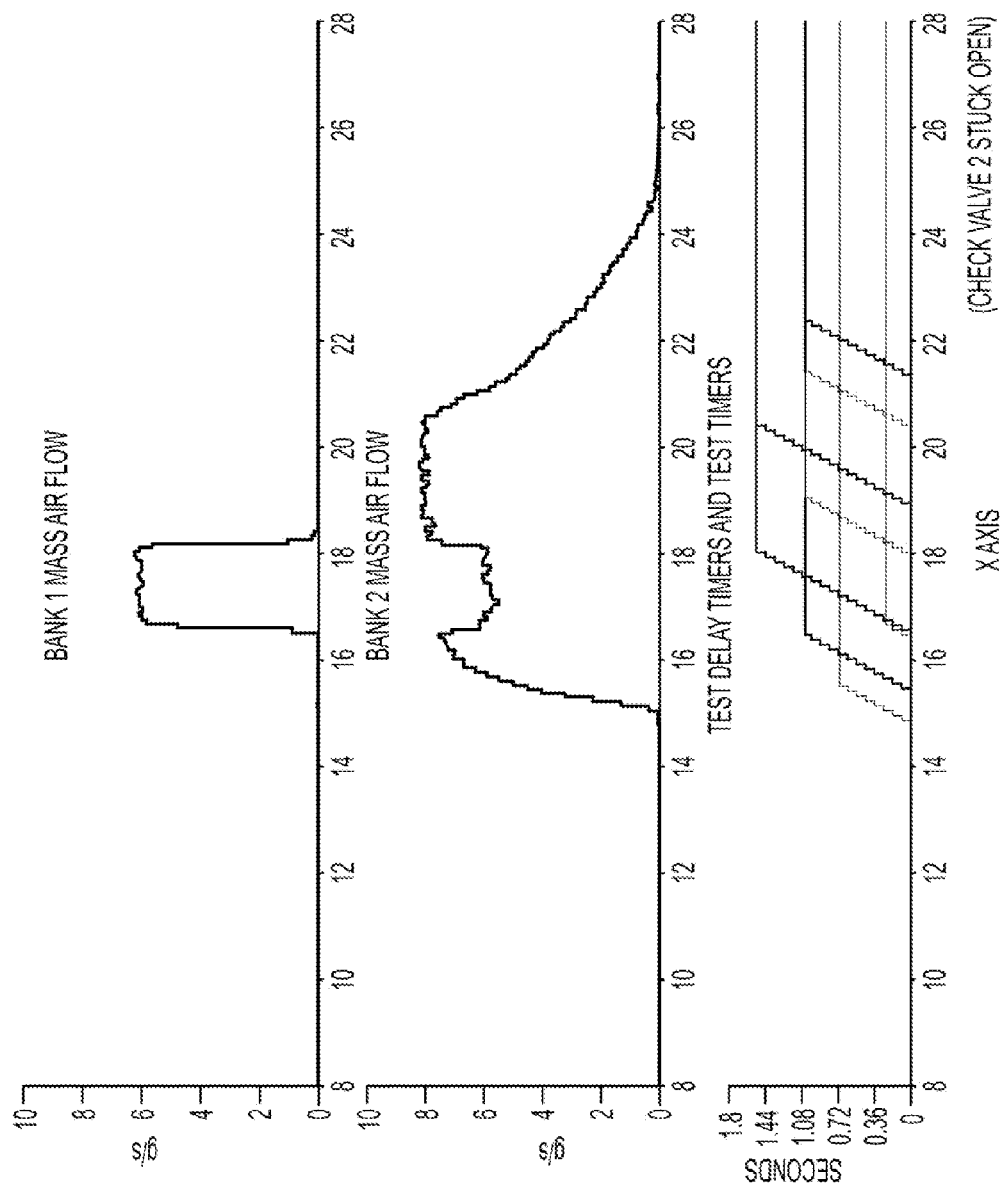
FIG. 21 is a graph showing results of the FIG. 4 diagnostic test for a FIG. 1 secondary air system with a second check valve mechanically stuck open.

FIG. 19 shows results from test 200 when vacuum hose 147 is disconnected from check valve 131 (bank 1) and the check valve is mechanically stuck open. Thus, check valve 130 (bank 2) continues to operate normally. Here, bank 2 (MAF sensor 120) reports normal operation, and passes all phases, where bank 1 fails all phases except B. FIG. 21 shows similar results when vacuum hose 146 is disconnected from check valve 130 (bank 2) instead, and check valve 130 is mechanically stuck open.

Figure 20:
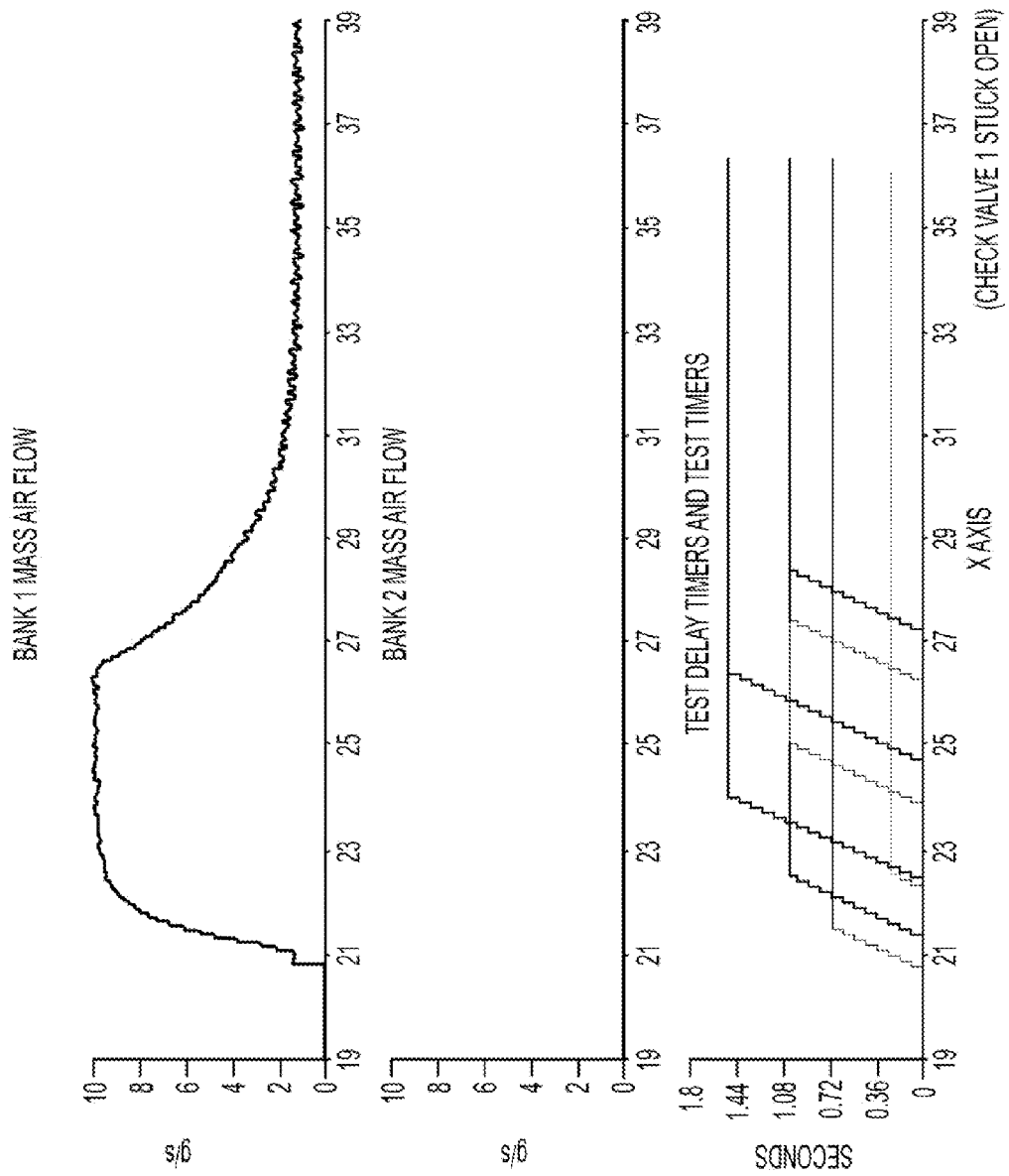
FIG. 20 is a graph showing results of the FIG. 4 diagnostic test for a FIG. 1 secondary air system with a first check valve mechanically stuck open and a vacuum hose disconnected.
Figure 22:
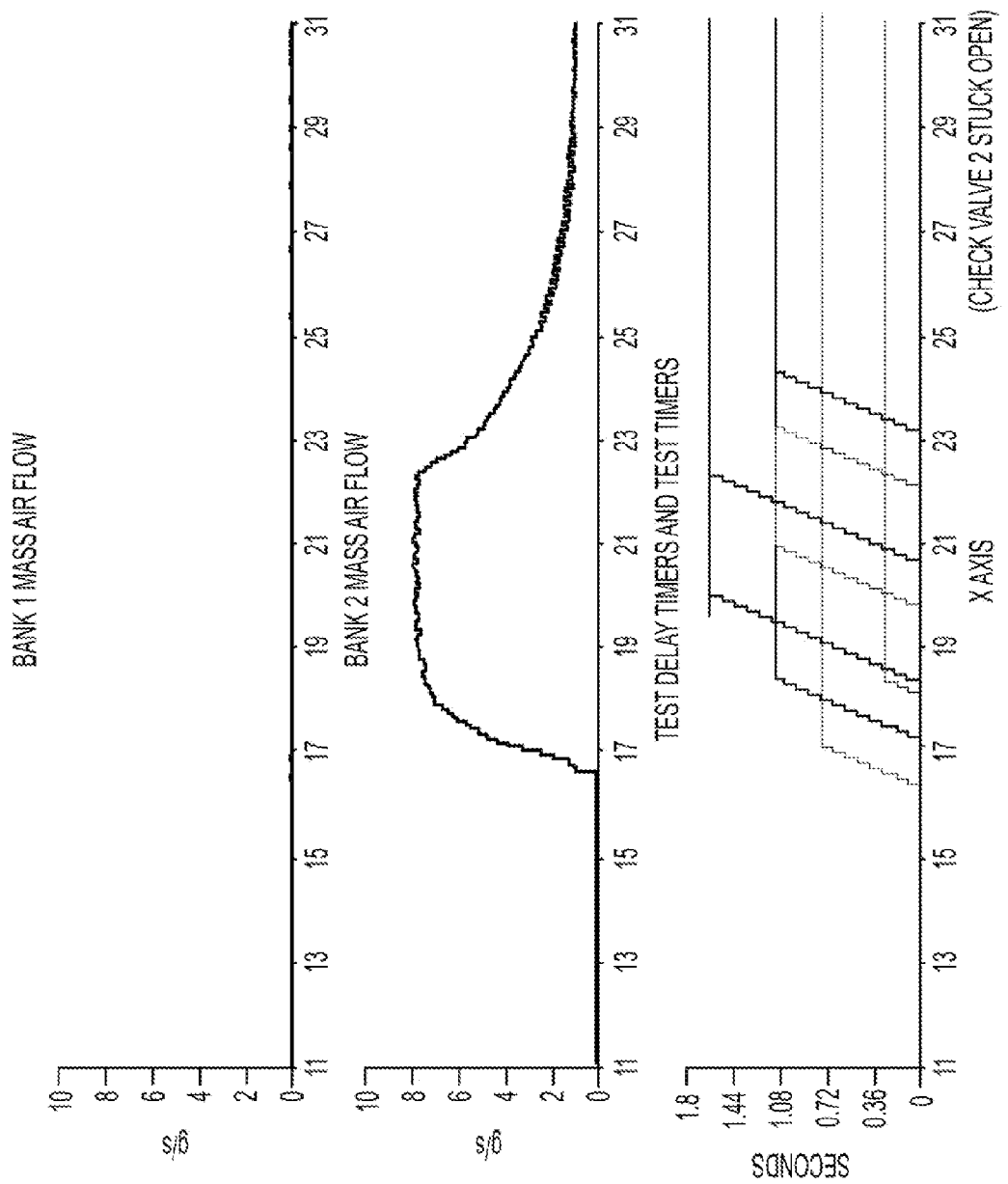
FIG. 22 is a graph showing results of the FIG. 4 diagnostic test for a FIG. 1 secondary air system with a second check valve mechanically stuck open and a vacuum hose disconnected.

FIG. 20 shows results from test 200 when vacuum hose 147 is disconnected from check valve 131 (bank 1) and check valve 131 is stuck open. Since check valve 130 receives no vacuum at all, it cannot open. Thus, the results for MAF sensor 121 (bank 1) show failure in all phases ('high flow' in phase B), and the results for MAF sensor 120 (bank 2) shows failure ('low flow') in phase B. FIG. 22 shows similar results when vacuum hose 146 is disconnected from check valve 130 (bank 2) instead, and check valve 130 is stuck open.

Figure 23:
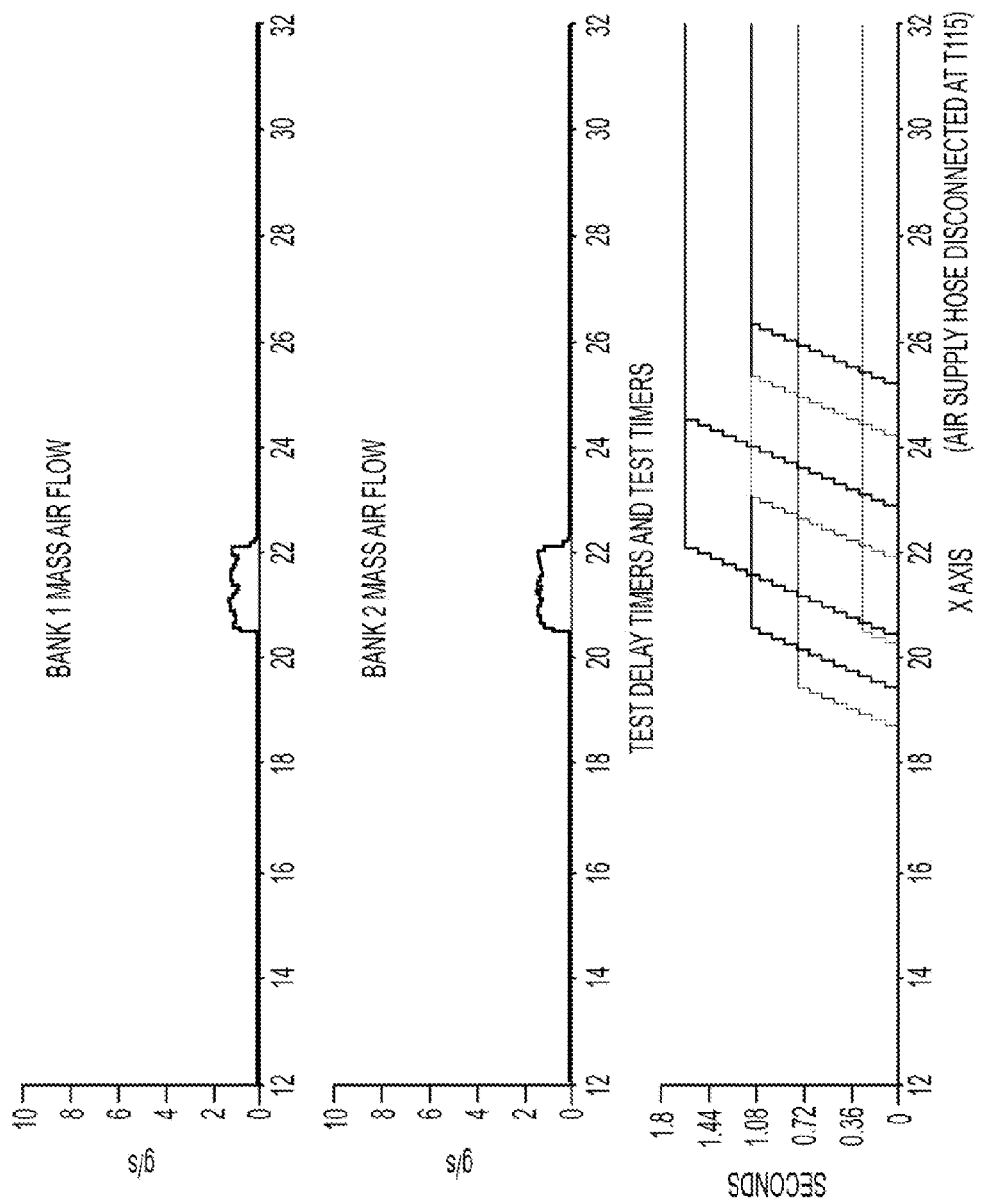
FIG. 23 is a graph showing results of the FIG. 4 diagnostic test for a FIG. 1 secondary air system with an air supply hose disconnected at a T-junction.

For an example of a failure before a MAF sensor, FIG. 23 shows results from test 200 when air hose 114 is disconnected at T-junction 115. All other components operate normally. As can be seen from the results, phases A, C and D pass for both MAF sensors 120, 121 and phase B reports 'low flow.' The disconnected air hose 114 is confirmed by further analysis of the data from phase B being greater than near zero for both MAF sensors 120, 121.

Figure 26:
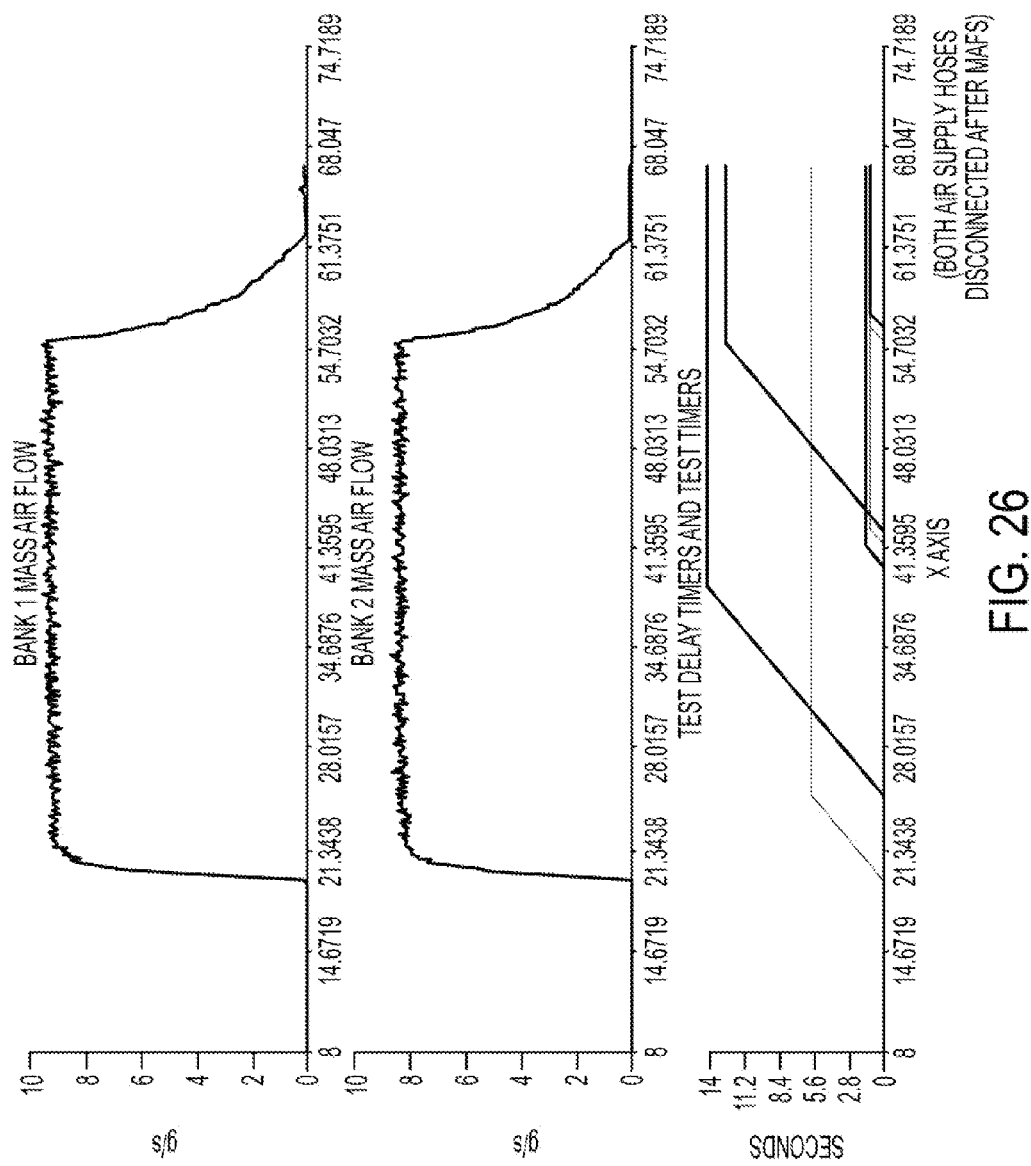
FIG. 26 is a graph showing results of the FIG. 4 diagnostic test for a FIG. 1 secondary air system with air supply hoses disconnected after both mass airflow sensors.

For an example of a failure after a MAF sensor, FIG. 26 shows results when both air hoses 126 and 127 are disconnected, where phases A, C and D fail for both MAF sensors 120, 121 and phase B reports 'hi flow.'

As can be inferred, these tests are not always single component determinative. Sometimes, results obtained will indicate possible failure or disconnection of multiple components.

Figure 24:
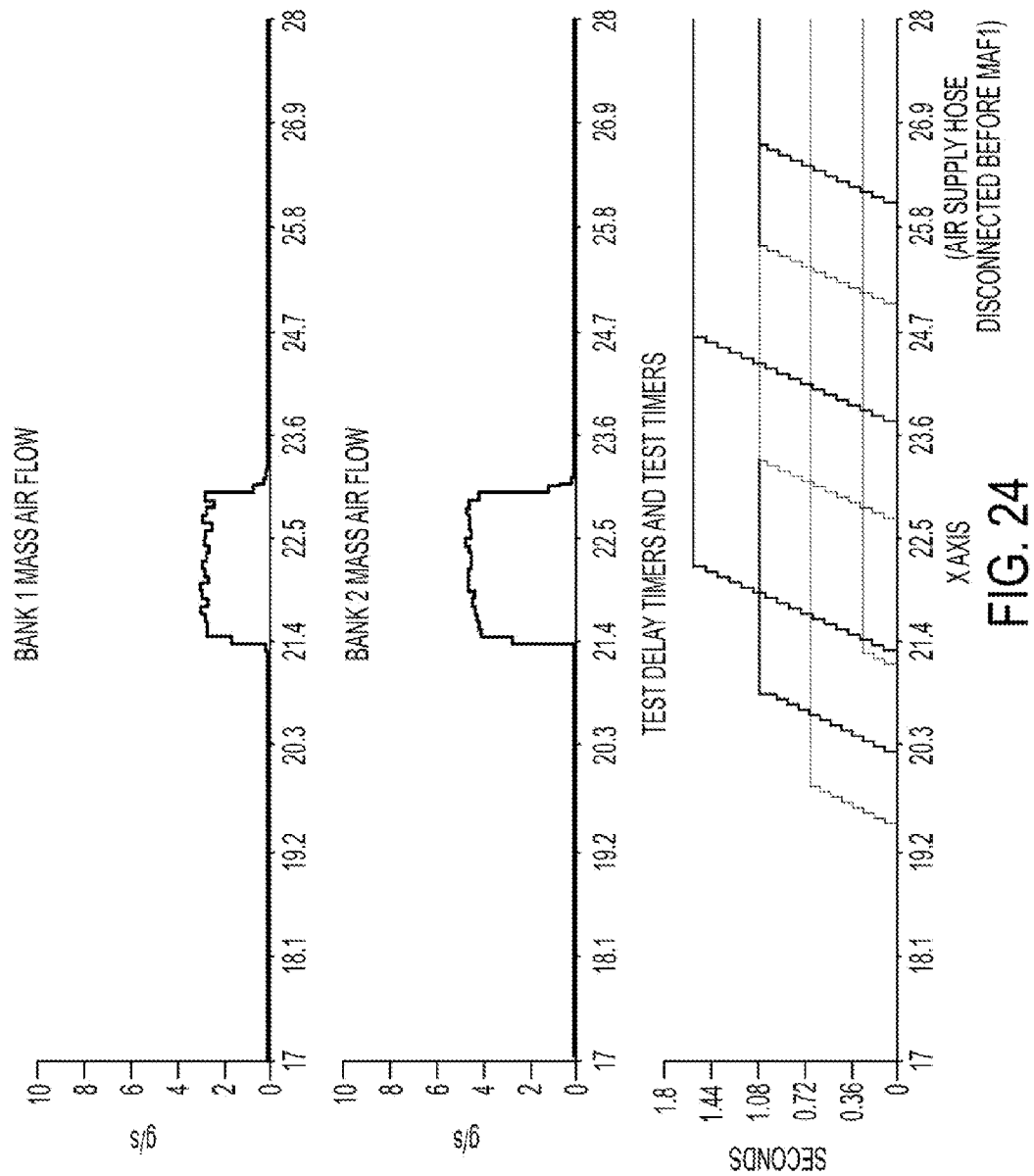
FIG. 24 is a graph showing results of the FIG. 4 diagnostic test for a FIG. 1 secondary air system with an air supply hose disconnected before a first mass airflow sensor.
Figure 25:
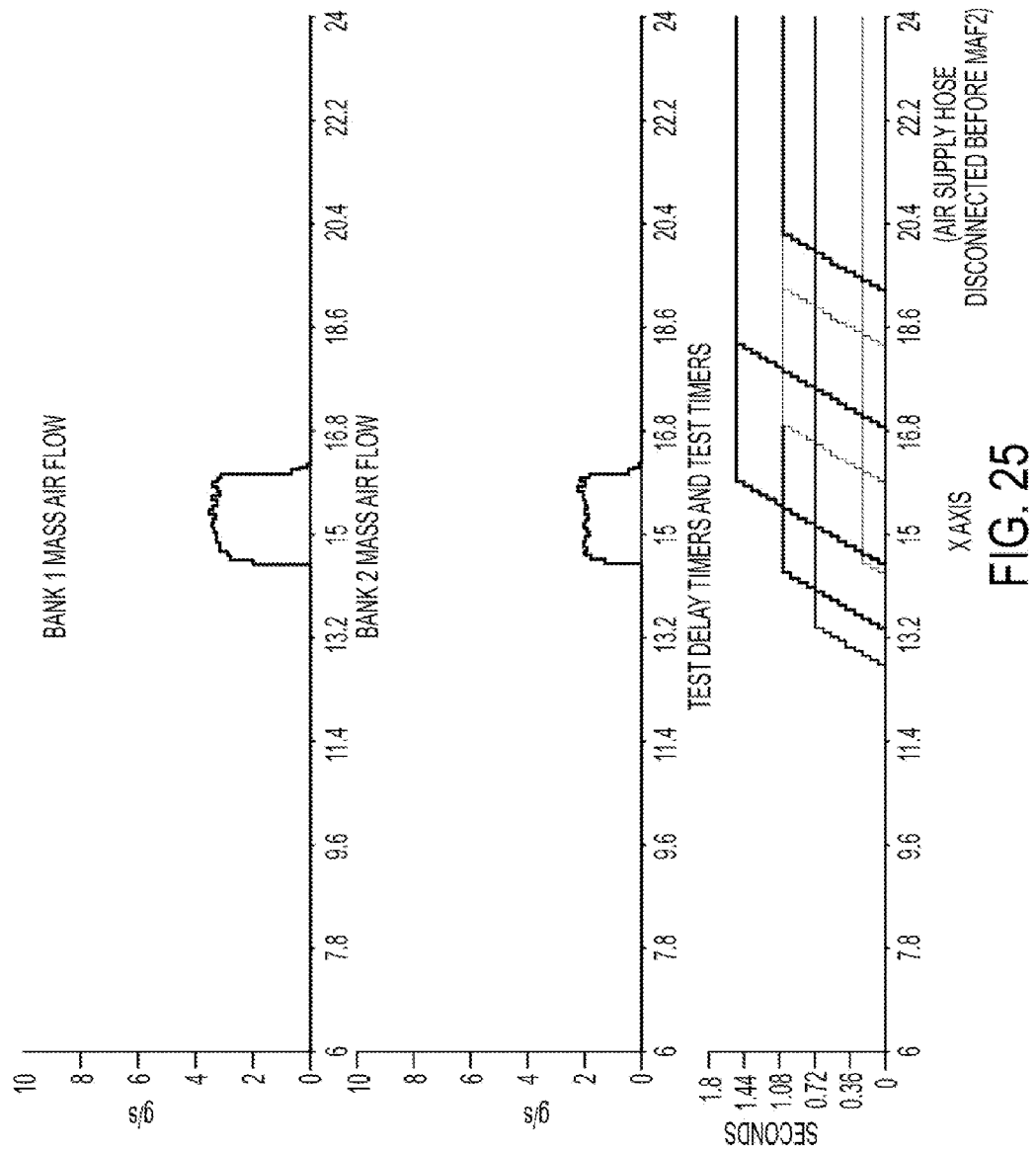
FIG. 25 is a graph showing results of the FIG. 4 diagnostic test for a FIG. 1 secondary air system with an air supply hose disconnected before a second mass airflow sensor.

FIG. 24 shows results from test 200 when air hose 117 is disconnected between T-junction 115 and MAF sensor 121. All other components operate normally. Again phases A, C and D pass for both MAF sensors 120, 121, and phase B reports 'low flow,' but the disconnected air hose 117 can be detected by further analysis of the data from phase B showing that both MAF sensors 120, 121 report non-near-zero results, but that MAF sensor 121 (bank 1) reports a lower average air flow than MAF sensor 120 (bank 2). FIG. 25 shows similar results when air hose 116 is disconnected.

Figure 27:
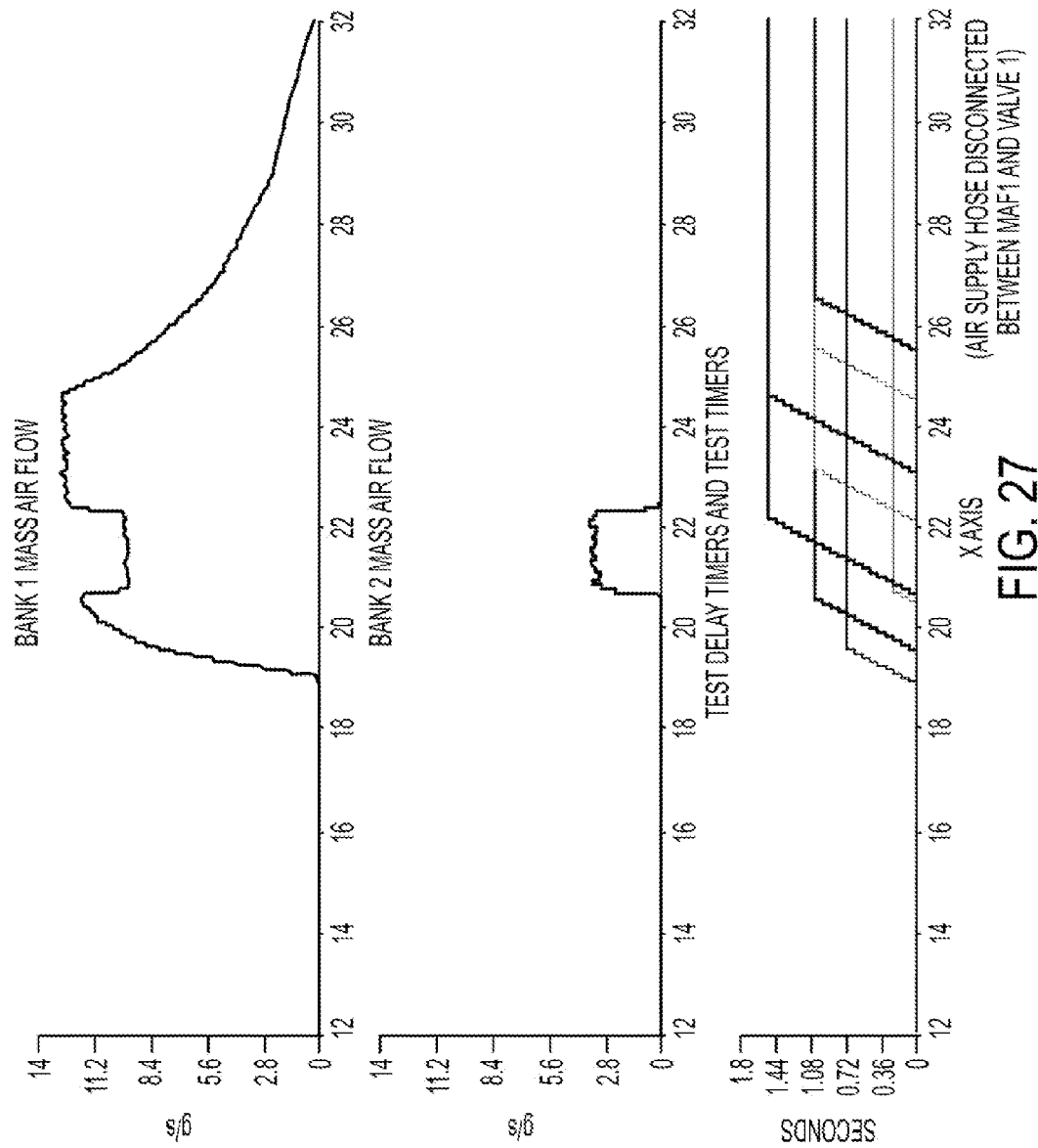
FIG. 27 is a graph showing results of the FIG. 4 diagnostic test for a FIG. 1 secondary air system with an air supply hose disconnected after a first mass airflow sensor but before a first check valve.
Figure 28:
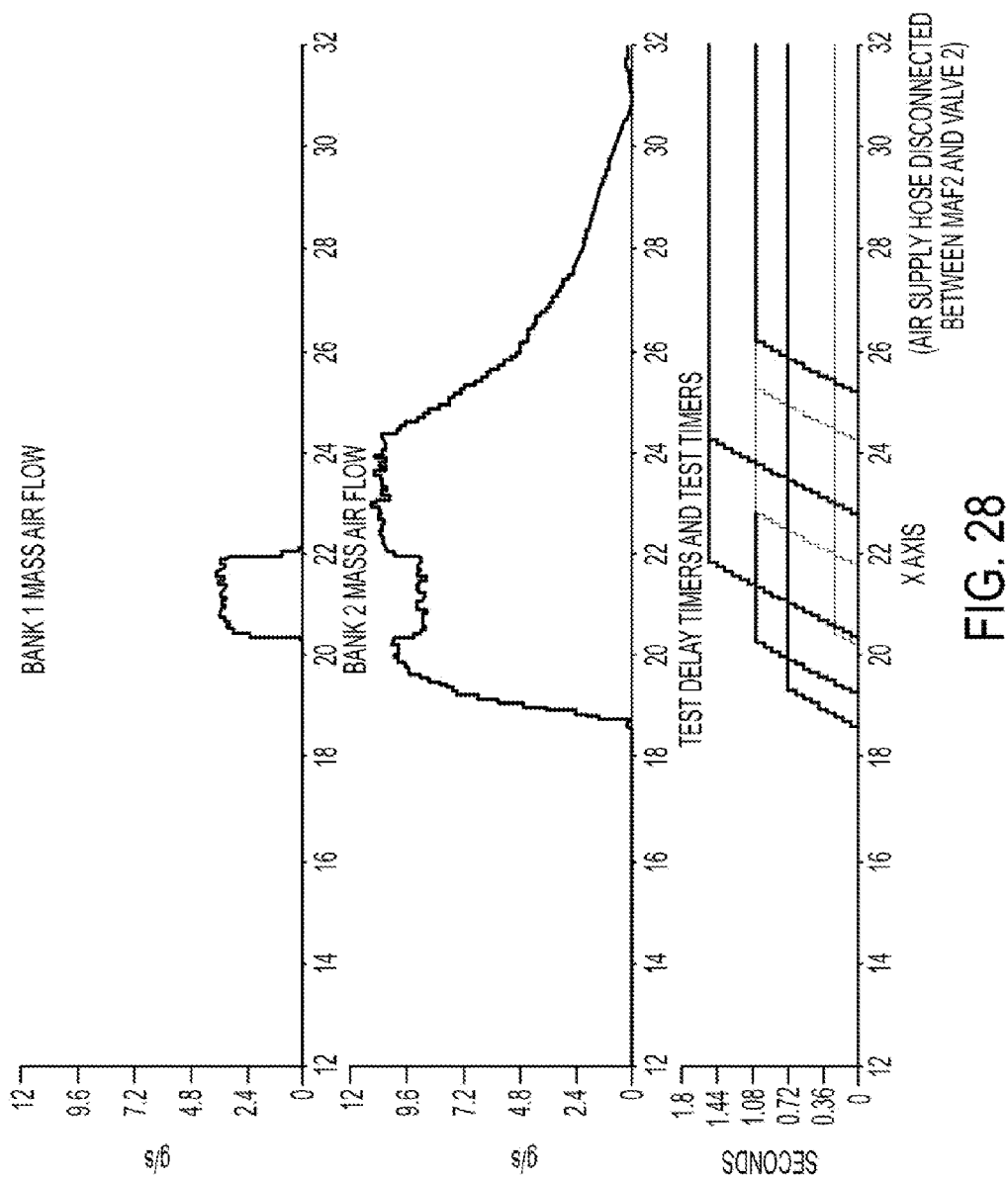
FIG. 28 is a graph showing results of the FIG. 4 diagnostic test for a FIG. 1 secondary air system with an air supply hose disconnected after a second mass airflow sensor but before a second check valve.

FIG. 27 shows results from test 200 when air hose 127 is disconnected between MAF sensor 121 and check valve 131. The results for MAF sensor 121 (bank 1) show failure in all phases ('high flow' in phase B), and the results for MAF sensor 120 (bank 2) shows failure ('low flow') in phase B. Here, however, the super-high air flow to MAF sensor 121 indicates the location of the failure. FIG. 28 shows similar results when air hose 126 is disconnected.

Figure 29:
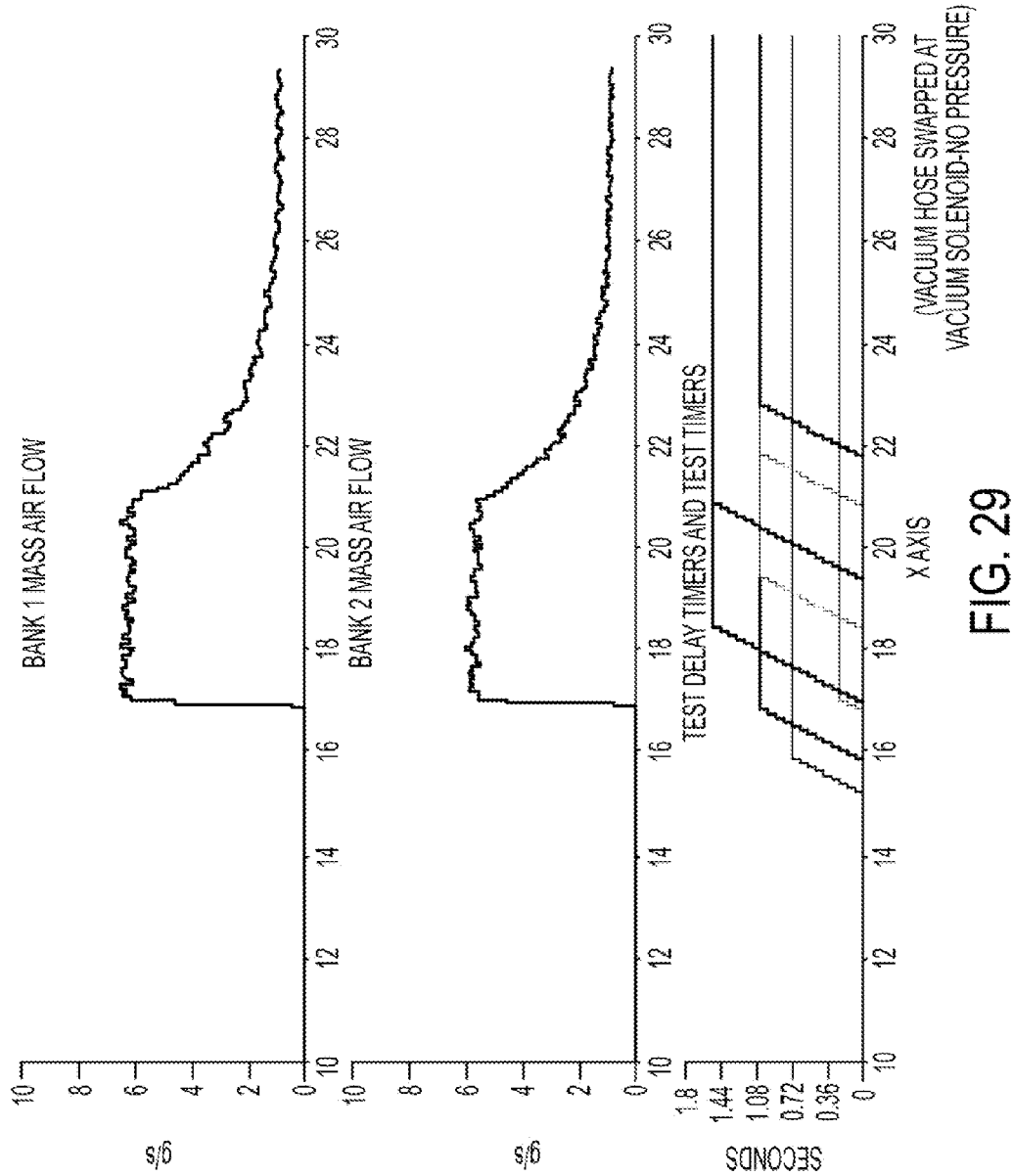
FIG. 29 is a graph showing results of the FIG. 4 diagnostic test for a FIG. 1 secondary air system with vacuum hoses swapped at the vacuum solenoid, but no pressure in the vacuum line.
Figure 30:
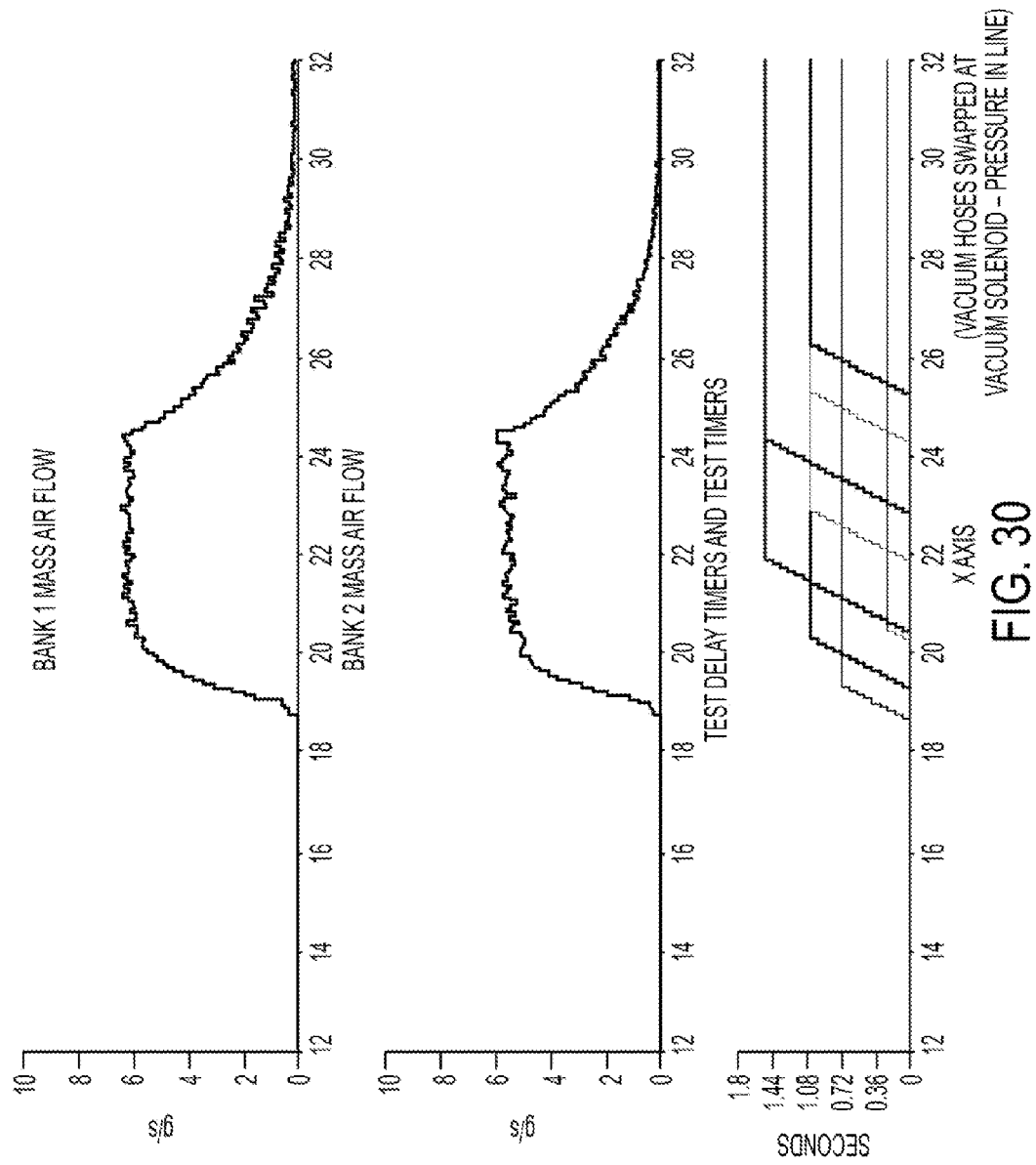
FIG. 30 is a graph showing results of the FIG. 4 diagnostic test for a FIG. 1 secondary air system with vacuum hoses swapped at the vacuum solenoid, with pressure in the vacuum line.

FIG. 29 shows results when vacuum input hose 143 and output hose 144 are swapped at the vacuum solenoid 140 and there is no pressure in the vacuum hose 144, but all other components operate normally. Once solenoid 140 is opened (in phase B), check valves 130, 131 both open. However, since there is no ability to relieve the vacuum with the hoses swapped, check valves 130, 131 stay open in phases C and D. Thus, phases A and B pass for both MAF sensors 120, 121, but phases C and D both fail. FIG. 30 shows results for the same mis-configuration but when there is pressure in the vacuum hose 114 (thus, check valves 130, 131 are both stuck open). Since the results here are similar to the FIG. 18 results (vacuum solenoid 140 stuck open), all of vacuum solenoid 140, input hose 143 and output hose 144 should be checked.

Figure 31:
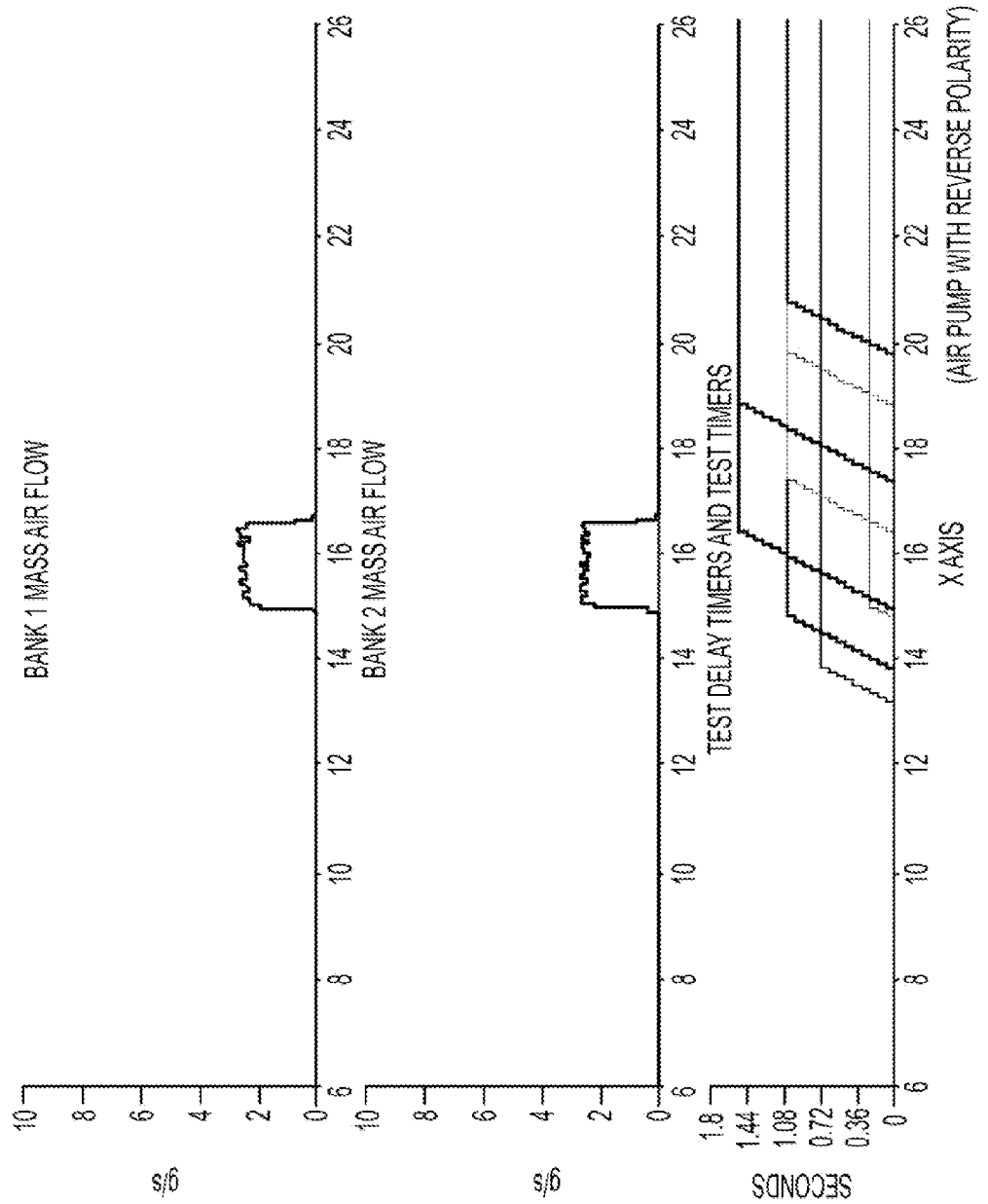
FIG. 31 is a graph showing results of the FIG. 4 diagnostic test for a FIG. 1 secondary air system with the air pump wired in reverse polarity.

FIG. 31 shows results from an air pump 110 being wired electrically backwards (or with reverse polarity). In this instance, air actually flows at a slower speed than is desirable to some degree through system 100. Results are similar to FIG. 23 (air hose 114 disconnected at T-junction 115), but analysis of the phase B results indicates higher average airflow, thus indicating mis-wiring, instead of a disconnected hose.

Figure 32:
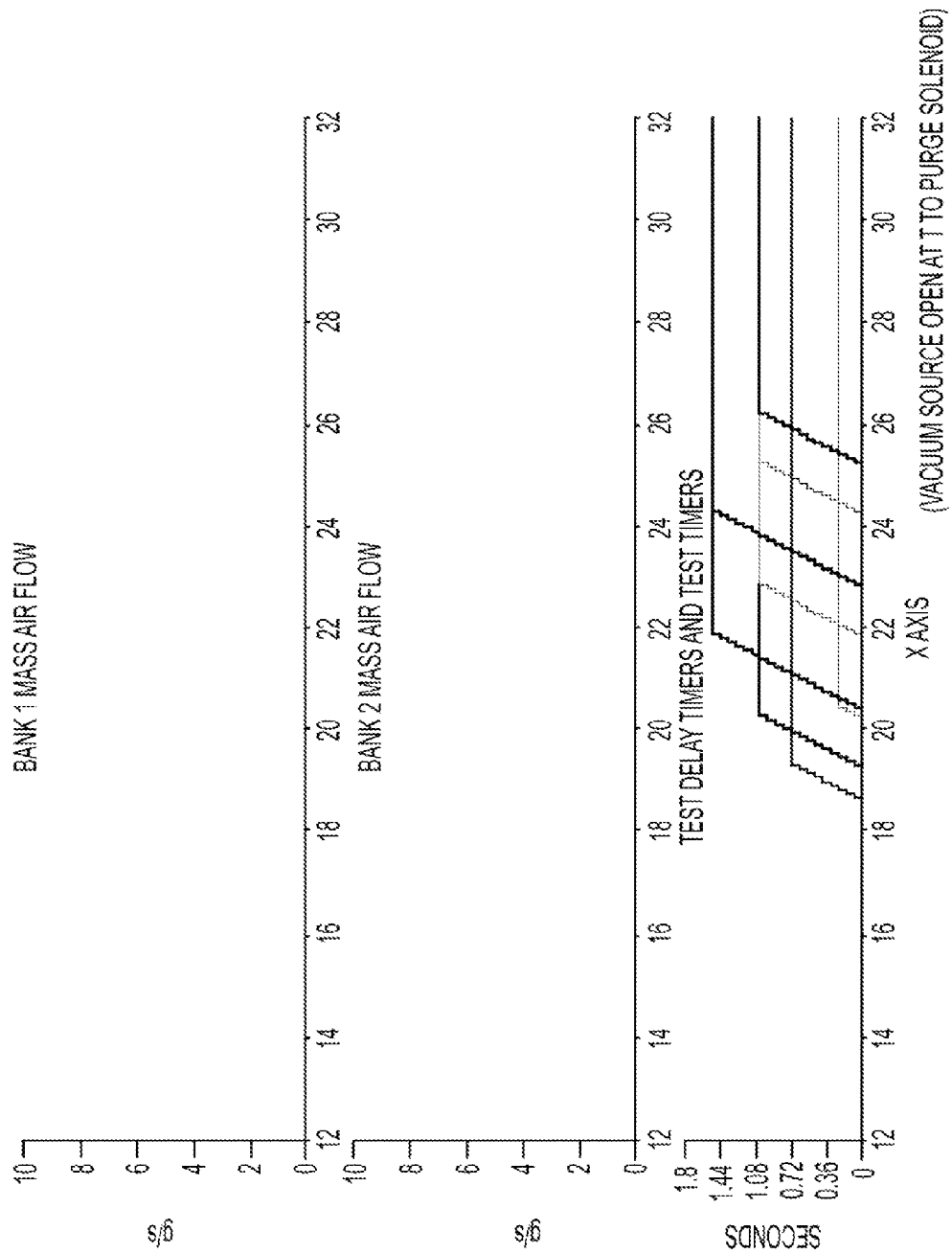
FIG. 32 is a graph showing results of the FIG. 4 diagnostic test for a FIG. 1 secondary air system with a vacuum source open at a T-junction to a purge solenoid.

FIG. 32 shows results when the vacuum source 141 is open at the connection to purge solenoid 142. Since the check valves 130, 131 receive no vacuum, they stay closed. Thus, phase B will report a failure, 'low flow' for both MAF sensors 120, 121 and phases A, C, D will report a pass because no flow is expected since the check valves are at a rest state (closed).

Figure 33:
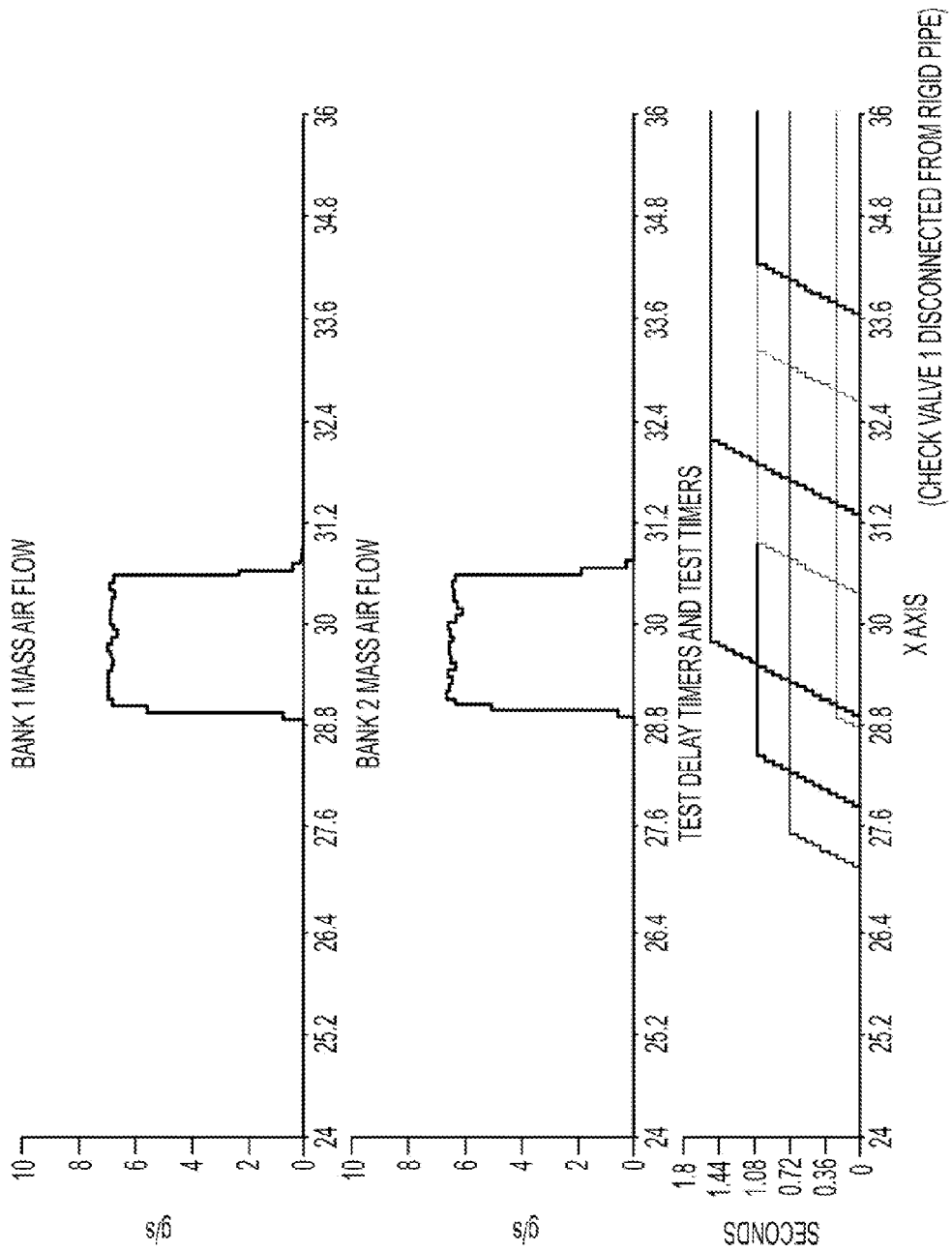
FIG. 33 is a graph showing results of the FIG. 4 diagnostic test for a FIG. 1 secondary air system with a first check valve disconnected from a first exhaust transfer pipe.
Figure 34:
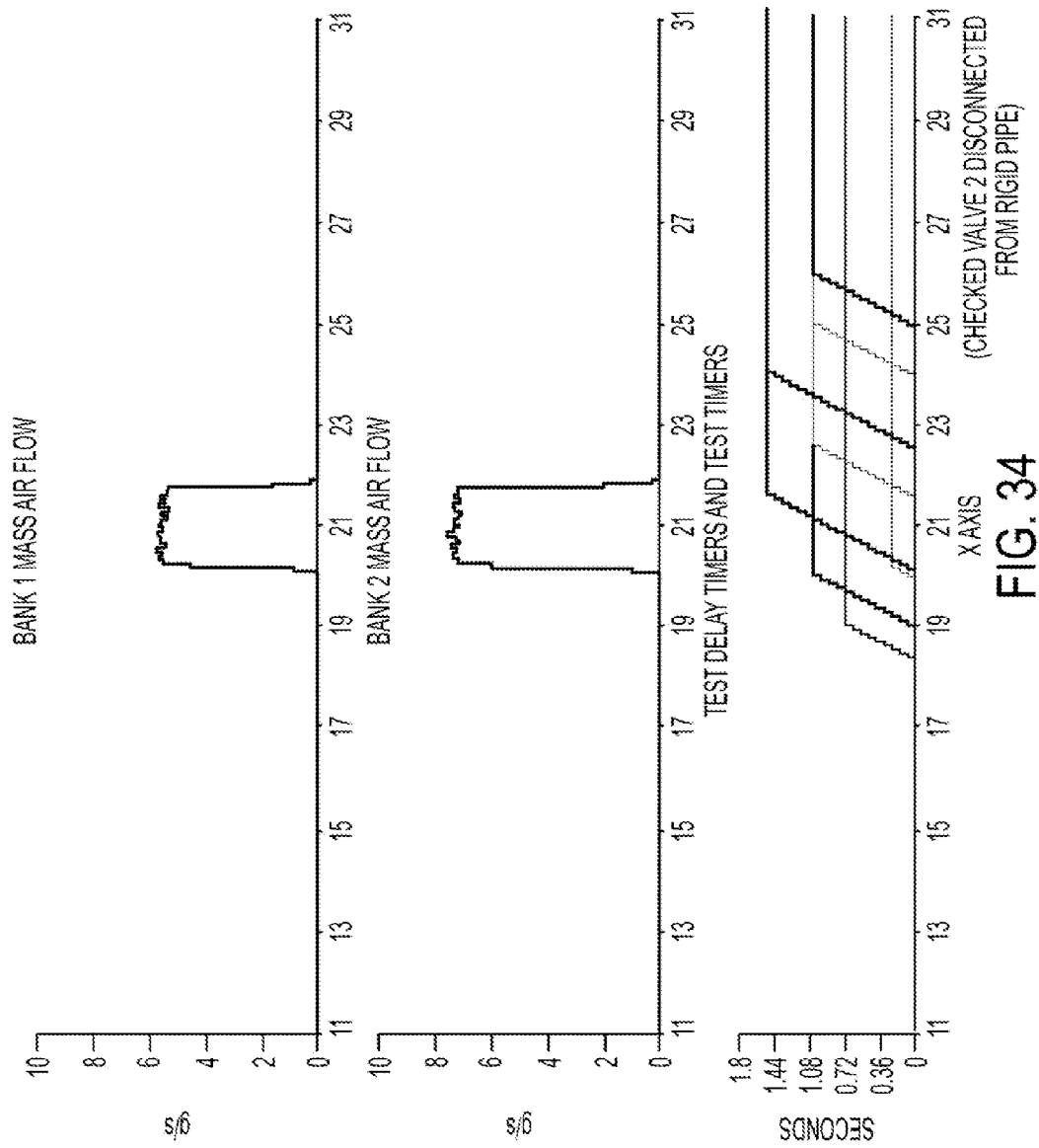
FIG. 34 is a graph showing results of the FIG. 4 diagnostic test for a FIG. 1 secondary air system with a second check valve disconnected from a second exhaust transfer pipe.

FIG. 33 shows results when check valve 131 (bank 1) is disconnected from rigid exhaust transfer pipe 137. FIG. 34 shows similar results with a check valve 130 (bank 2) disconnection. The disconnection of a rigid exhaust transfer pipe 136 (opposite bank or side not shown) causes a divergence in air flow between MAF sensors 120, 121, since there is less air impedance in bank 2. However, that divergence is not enough to cause a failure of any of the phases of the test 200. Phase E, which was discussed above, allows a proper diagnosis of this condition.

FIG. 35 depicts an exemplary embodiment of "Secondary Air Diagnostic Hierarchy & Fault Maturation Summary" guide using four DTCs for use in establishing a fault table output such as the output shown FIG. 7, although FIG. 7 is an example of a large number of Test Failure Modes to show an example of a large test scope capability. The logic shown in FIG. 35 is utilized to determine the output in the fault matrix of FIG. 7 (4 or 5 phases, sensor rationality and DTC). The output in all of the columns will then aid the test technician to look to certain areas of bank 1 and bank 2 to further investigate potential failures. The output in all the columns helps the technician narrow the number of locations having potential failure issues such as components that may be failing, installed incorrectly, or otherwise the location is a source causing undesirable air system operation.

The diagnostic test disclosed herein for vehicle secondary air systems can be utilized to great benefit in-plant or post-plant to verify desirable installation and operation. A vehicle controller can be configured to include a representation of the secondary air system for the vehicle and the controller can include an algorithm of the diagnostic test configured for the vehicle. Conducting a diagnostic test of the secondary air system can be accomplished, for example, by a technician who interfaces with the vehicle controller, such as by using electrical and computer devices (controllers, monitors, etc.), to initiate and conduct the diagnostic test as described herein. The test output may include one or more bits of data and flags and one or more corresponding predetermined possible failure modes based on the data from the four or five testing phases. The technician then utilizes the possible failure modes, for example such as some shown in FIG. 7, to investigate those failure modes/areas of the vehicle system and perform repair/replacement accordingly, quickly and cost effectively using the comprehensive diagnostic test.

What is claimed is:

1. A diagnostic test for a secondary air system comprising an air pump, a first mass air flow sensor in fluid communication with the air pump, and a first check valve in fluid communication with the first mass air flow sensor, the method comprising:

conducting a first testing phase comprising a first delay period and a first testing period wherein the air pump is activated;

conducting a second testing phase comprising a second delay period and a second testing period wherein the first check valve is opened;

conducting a third testing phase comprising a third delay period and a third testing period wherein the check valve is closed;

conducting a fourth testing phase comprising a fourth delay period and a fourth testing period wherein the air pump is deactivated; and determining one or more failure modes of the system based on the output from the four testing phases.

2. The diagnostic test of claim 1, further comprising a second check valve in fluid communication with the air pump and a second mass flow sensor in fluid communication with the second check valve and the second check valve is opened in the second testing period and the second check valve is closed in the third testing period, wherein the test further includes recording measured air flow from each of the first and second mass air flow sensors during each of the first, second, third and fourth testing periods.

3. The diagnostic test of claim 2, wherein the measured air flow recorded for each of the first and second mass air flow sensors is compared to predetermined operating characteristics expected to be recorded in the first, second, third and fourth testing periods.

4. The diagnostic test of claim 3, wherein the predetermined operating characteristics expected to be recorded in the first testing period comprise air flow below a near zero threshold.

5. The diagnostic test of claim 4, wherein the predetermined operating characteristics expected to be recorded in the second testing period comprise air flow within an expected operating range.

6. The diagnostic test of claim 5, wherein the predetermined operating characteristics expected to be recorded in the third testing period comprise air flow below the near zero threshold.

7. The diagnostic test of claim 6, wherein the predetermined operating characteristics expected to be recorded in the fourth testing period comprise air flow below the near zero threshold.

8. The diagnostic test of claim 7, wherein the near zero threshold is approximately 0.29 g/s, and the expected operating range is between approximately 4.0 g/s and 8.0 g/s.

9. The diagnostic test of claim 7, further including incrementing a respective fail counter for each bank for each of the first, second, third and fourth testing periods where the measured air flow recorded is not consistent with the predetermined operating characteristics expected to be recorded.

10. The diagnostic test of claim 9, further including two fail counters for the second testing period, one incremented if air flow exceeds the expected operating range, and one incremented if air flow falls below the expected operating range.

11. The diagnostic test of claim 10, wherein the results stored in each fail counter are combined to form a bit result, and the bit result is matched to one or more potentially failed or incorrectly installed components.

12. The diagnostic test of claim 11, wherein the matching comprises using a lookup table.

13. The diagnostic test of claim 10, further including recording an average air flow at both the first and second mass air flow sensors during the first and second testing periods and using the recorded average air flows to determine whether first and second mass air flow sensors are operating properly.

14. The diagnostic test of claim 2, wherein the first delay period is predetermined to allow the air pump to fully ramp up.

15. The diagnostic test of claim 2, wherein the second delay period is predetermined to allow the first and second check valve to open.

16. The diagnostic test of claim 2, wherein the third delay period is predetermined to allow the first and second check valve to close.

17. The diagnostic test of claim 2, wherein the fourth delay period is predetermined to allow the air pump to spin down.

18. The diagnostic test of claim 2, further comprising a fifth phase comprising a fifth delay period and a fifth testing period wherein the air pump remains deactivated, but the first and second check valves are opened while engine speed is increased.

19. The diagnostic test of claim 18, further comprising recording measured air flow from each of the first and second mass air flow sensors during the fifth testing period, and comparing the measured air flow to an expected operating range, wherein one or more failure modes of the system is determined based on the output from the five testing phases.

20. A secondary air system comprising:
an air pump;
first and second air flow measuring means connected to the air pump;
first and second air flow control means respectively connected to the first and second air flow measuring means, defining first and second banks of the secondary air system; and
a plurality of fail counters for recording the results, for each bank, of each phase of a diagnostic test of the secondary air system, the diagnostic test comprising:
conducting a first testing phase comprising a first delay period and a first testing period wherein the air pump is activated;
conducting a testing second phase comprising a second delay period and a second testing period wherein the first and second air flow control means are opened;
conducting a third testing phase comprising a third delay period and a third testing period wherein the first and second air flow control means are closed;
conducting a fourth testing phase comprising a fourth delay period and a fourth testing period wherein the air pump is deactivated; and
determining one or more failure modes of the system based on the output from the four testing phases.

* * * * *